United States Patent
Yiu et al.

(10) Patent No.: US 7,328,295 B2
(45) Date of Patent: Feb. 5, 2008

(54) INTERRUPT CONTROLLER AND INTERRUPT CONTROLLING METHOD FOR PRIORITIZING INTERRUPT REQUESTS GENERATED BY A PLURALITY OF INTERRUPT SOURCES

(75) Inventors: Man Cheung Joseph Yiu, Maidenhead (GB); James Robert Hodgson, Richmond (GB); David Francis McHale, Harrow (GB)

(73) Assignee: Arm Limited, Cambridge (GB)

( * ) Notice: Subject to any disclaimer, the term of this patent is extended or adjusted under 35 U.S.C. 154(b) by 338 days.

(21) Appl. No.: 10/737,796

(22) Filed: Dec. 18, 2003

(65) Prior Publication Data
US 2004/0199694 A1    Oct. 7, 2004

(30) Foreign Application Priority Data
Dec. 19, 2002   (GB) ................. 0229601.0

(51) Int. Cl.
G06F 13/24    (2006.01)
G06F 13/26    (2006.01)

(52) U.S. Cl. ............... 710/264; 710/262; 710/268; 710/269

(58) Field of Classification Search ........... 710/260, 710/262, 264–266, 268–269, 41, 48–50; 712/244
See application file for complete search history.

(56) References Cited

U.S. PATENT DOCUMENTS 4,275,458 A    6/1981    Khera (Continued)

FOREIGN PATENT DOCUMENTS

CA    1 218 465    *    2/1987
EP    0 358 163 A1    3/1990
EP    0 685 798 A2    12/1995

OTHER PUBLICATIONS

ARM PrimeCell Vectored Interrupt Controller (PL190) Technical Reference Manual. ARM Limited. Sep. 2000. ARM DDI 0181C.*

(Continued)

*Primary Examiner*—Mark H. Rinehart
*Assistant Examiner*—Thomas J Cleary
(74) *Attorney, Agent, or Firm*—Nixon & Vanderhye P.C.

(57) ABSTRACT

An interrupt controller and interrupt controlling method are provided for prioritizing interrupt requests generated by a plurality of interrupt sources. The interrupt controller comprises an interrupt source interface operable to receive interrupt requests generated by a first plurality of interrupt sources, and a daisy chain interface operable to receive a daisy chain interrupt request output by a further interrupt controller based on a second plurality of interrupt requests generated by a second plurality of interrupt sources. The daisy chain interface includes a priority input operable to receive a daisy chain priority signal indicating a priority associated with the daisy chain interrupt request. Prioritization logic is operable to receive the daisy chain priority signal and to apply predetermined prioritisation criteria to determine the highest priority interrupt request selected from the daisy chain interrupt request and the interrupt request generated by the first plurality of interrupt sources. An output interface is operable to output the highest priority interrupt request, the output interface including a priority output operable to provide an output priority signal indicating a priority associated with the highest priority interrupt request.

31 Claims, 15 Drawing Sheets

U.S. PATENT DOCUMENTS

| | | | |
|---|---|---|---|
| 5,481,725 A * | 1/1996 | Jayakumar et al. | 710/48 |
| 5,506,997 A * | 4/1996 | Maguire et al. | 710/260 |
| 5,640,571 A * | 6/1997 | Hedges et al. | 710/261 |
| 5,887,175 A * | 3/1999 | Col et al. | 710/260 |
| 6,070,221 A * | 5/2000 | Nakamura | 710/264 |
| 6,098,144 A * | 8/2000 | De Oliveira et al. | 710/269 |
| 6,105,140 A * | 8/2000 | Crisan | 713/310 |
| 6,442,631 B1 * | 8/2002 | Neufeld et al. | 710/107 |
| 6,466,998 B1 * | 10/2002 | Bennett | 710/48 |
| 2001/0049763 A1 * | 12/2001 | Barry et al. | 710/264 |
| 2002/0112107 A1 | 8/2002 | Joffrain | |
| 2004/0236879 A1 * | 11/2004 | Croxford et al. | 710/48 |

OTHER PUBLICATIONS

"The American Heritage Dictionary". Second College Edition. 1982. Houghton Mifflin Company. Entries 'operable' and 'operate'. p. 871. ISBN 0-395-32943-4.*

Horelick, Dale. "Simple Versatile CAMAC Crate Controller and Interrupt Priority Encoding Module". Presentation at 1974 IEEE Nuclear Science Symposium, Dec. 11-13, 1974. Stanford Liniar Accellerator Center, Standford University, Stanford, California. Stanford Linear Accelerator Center Publication 1513. pp. 1-4.*

* cited by examiner

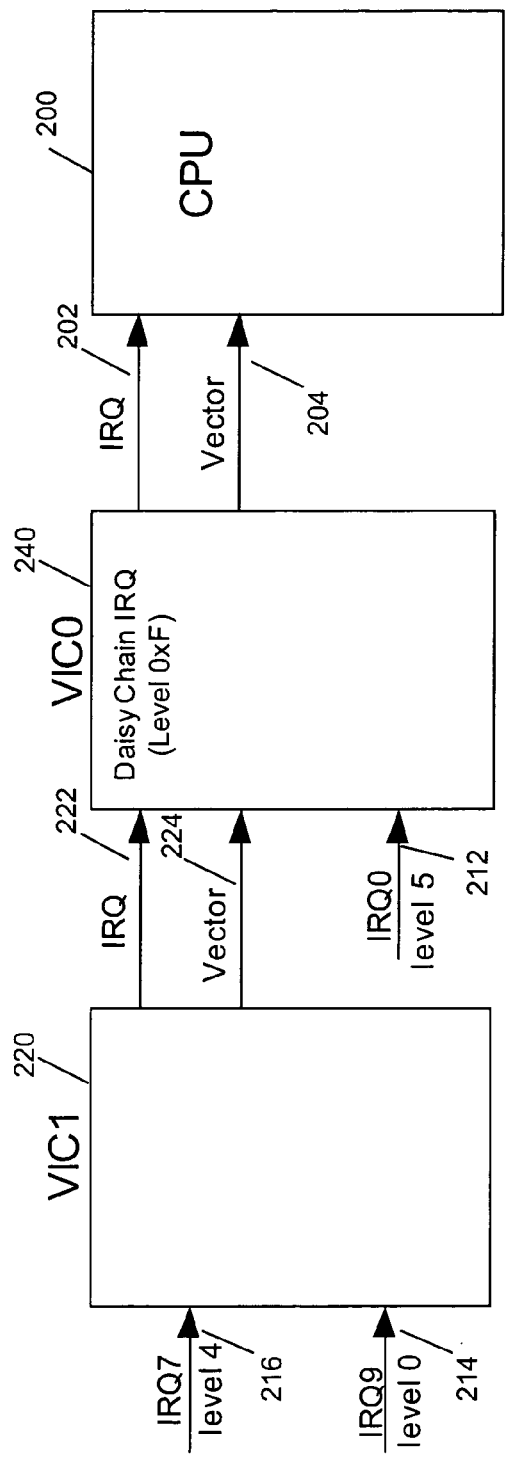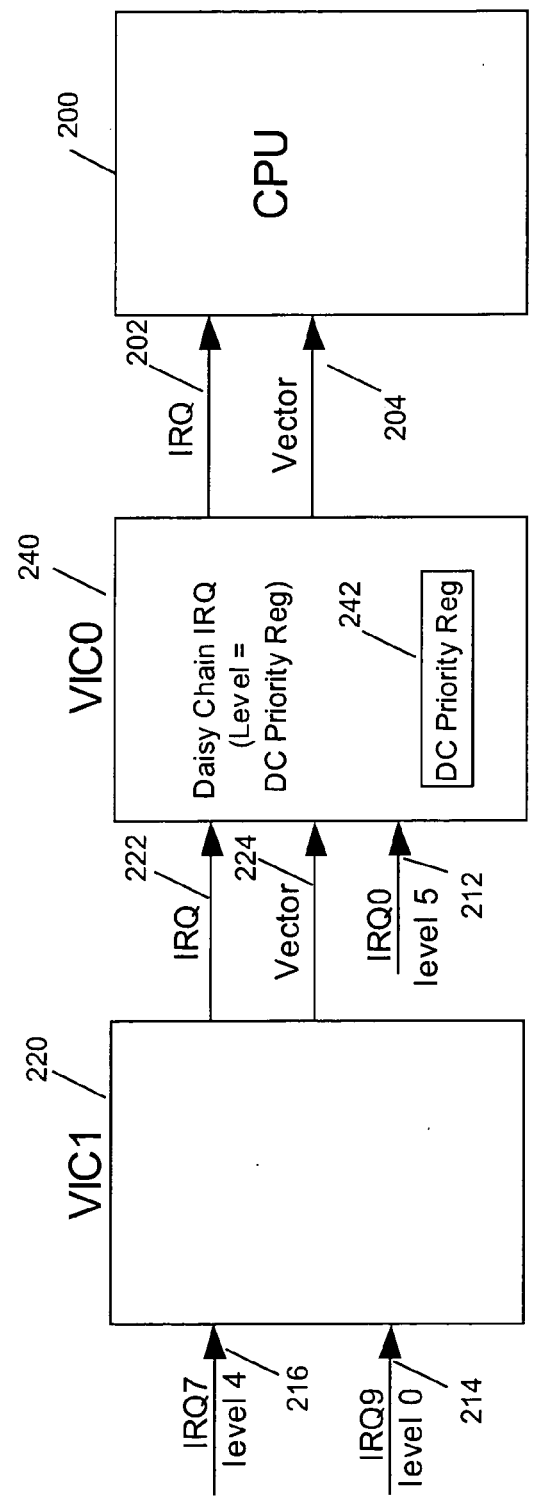
Fig. 2A (PRIOR ART)
Fig. 2B (PRIOR ART)

INTERRUPT CONTROLLER AND INTERRUPT CONTROLLING METHOD FOR PRIORITIZING INTERRUPT REQUESTS GENERATED BY A PLURALITY OF INTERRUPT SOURCES

BACKGROUND OF THE INVENTION

1. Field of the Invention

The present invention relates to techniques for prioritizing interrupt requests generated by a plurality of interrupt sources.

2. Description of the Prior Art

When devices within a data processing system require a processor within the data processing system, typically the CPU, to perform a service routine, they will typically issue an interrupt request to that processor. When an interrupt request is received by the processor whilst it is executing a main process, the processor will typically temporarily interrupt the main process under execution, and instead execute the Interrupt Service Routine (ISR) specified by the interrupt request. The devices may be on the same chip as the processor, or may be off-chip. In a typical data processing system there will often be multiple devices which can issue such interrupt requests, and since the processor cannot simultaneously execute the ISRs defined by the plurality of interrupt requests, it is known to provide an interrupt controller for receiving the various interrupt requests, and prioritizing between them. Hence, interrupt requests from certain devices (for example a network interface) can be given higher priority than interrupt requests from other devices (for example a keyboard).

In a vectored interrupt controller (VIC) the controller will store a list of vector addresses for ISRs that are associated with each interrupt source, i.e. each device that can issue an interrupt request. Hence, when an interrupt request is received, the VIC can pass the exact location of the associated ISR code to the processor to enable the processor to begin execution of that ISR.

As data processing systems become more complex, then typically the number of interrupt sources increases. To handle this increase in interrupt sources, larger VICs can be designed having more inputs for receiving the interrupt requests from the various interrupt sources, but this results in the VIC incorporating more logic gates, and accordingly consuming more power. Further, the VIC will be larger in die area, thus giving rise to larger production costs. Accordingly, to keep the power consumption and production costs acceptable, a VIC is typically designed to have a number of inputs sufficient for many normal implementations, but not necessarily sufficient for all implementations, and hence for example VICs having 8, 16 or 32 interrupt source inputs are known.

However, there are an increasing number of systems where the number of interrupt sources exceeds that that can be handled by a single VIC, for example there is a tendency for the number of interrupt sources available in a System on Chip (SoC) to increase beyond that that can be handled by a single VIC. To facilitate the increasing number of interrupt sources available in such systems, it is known to develop a daisy chain consisting of a number of interrupt controllers, such as illustrated schematically in FIG. 1. In the example illustrated in FIG. 1, seven VICs 100, 110, 120, 130, 140, 150 and 160 are daisy chained together, with the VIC 100 being responsible for outputting the interrupt request to the CPU. Each interrupt request 170 issued to the CPU is accompanied by a corresponding vector address 180 specifying the location of the ISR to be executed by the CPU to process the interrupt request.

It is usual in such daisy chain techniques for the VICs higher in the daisy chain (i.e. closer to the CPU) to block higher level (i.e. higher priority) interrupt requests than the interrupt request currently being serviced in situations where that higher level interrupt request is generated by VICs lower in the chain (i.e. further from the CPU). One standard approach is illustrated in FIG. 2A, where a fixed priority level is set for interrupt requests received from a VIC lower in the chain (such interrupt requests being referred to herein as daisy chain interrupt requests). In the FIG. 2A example, CPU 200 is arranged to receive interrupt requests from the VIC 240. The VIC 240 is arranged to receive interrupt requests directly from certain interrupt sources, for example the interrupt request IRQ0 received over path 212 from interrupt source 0, and is further arranged to receive a daisy chain interrupt request 222, along with the corresponding daisy chain vector address 224, from the VIC 220.

In the example illustrated in FIG. 2A, any daisy chain interrupt request 222 from the VIC 220 will be assigned a fixed priority level, in this example the level hexadecimal F (which might typically be the lowest priority level). This is required since the priority encoding logic within the VIC 240 requires each input interrupt source to have a corresponding priority level associated with it to enable the priority encoding logic to be able to arbitrate between multiple interrupt requests received at the same time.

As a result, if the IRO0 interrupts request is received over path 212 at a time when no other interrupts are being processed, this will result in that interrupt request being output from the VIC 240 to the CPU 200 over path 202, along with the corresponding vector address determined by the VIC 240 being output over path 204 to the CPU 200. If whilst that interrupt request is being processed by the CPU 200, the interrupt request IRQ9 is received over path 214 at the VIC 220, this will result in a corresponding daisy chain interrupt request being out put over path 222, along with the corresponding vector address over path 224. In the example illustrated in FIG. 2A, priority levels having low numerical values indicate higher priorities, and accordingly the IRQ9 interrupt request has the highest priority level, i.e. level 0. However, the VIC 210 will treat the corresponding daisy chain interrupt request as having the priority level hexadecimal F, and accordingly will suppress generation of a corresponding interrupt request on path 202 whilst the IRQ0 interrupt request is being processed.

FIG. 2B illustrates an alternative prior art approach, where instead of a fixed priority level hard-coded into the VIC 240, the interrupt controller 240 has a separate priority register 242 identifying the priority for any daisy chain interrupt request received over path 222 from VIC 220. The value in this priority register 242 is programmable, but again is typically set at a relatively low priority level. It will be appreciated that the daisy chained VIC system illustrated in FIG. 2B operates in an analogous manner to that system shown in FIG. 2A, the only difference being that the priority level set within the priority register 242 is used rather than the fixed priority level of the FIG. 2A system. Accordingly, it will be seen that whenever the priority value stored in the priority register 242 represents a lower priority than level 5, then again whilst the IRQ0 interrupt is being processed by the CPU 200, no other interrupt request received by the VIC 220 will be processed, even if they have a higher priority than level 5.

As another example, if the interrupt request IRQ7 is received by VIC 220 over path 216 at a time when no other interrupts are being requested, the corresponding daisy chain interrupt request received over path 222, along with its corresponding vector address over path 224, will be routed on by the VIC 240 over paths 202, 204 to the CPU 200. However, in doing so, the priority level for IRQ7 will be reset within VIC 240 to the level stored within the priority register 242, which may by way of illustration be priority level 5. If whilst IRQ7 is being serviced by the CPU, IRQ9 having a level 0 priority (i.e. the highest priority) is asserted, VIC 220 passes the IRQ9 request through to VIC 240 as a corresponding daisy chain interrupt request. However, assuming the value in the priority register 242 is not changed, VIC 240 will then treat this daisy chain interrupt request as having a priority level 5, and will block it from reaching the CPU 200 until the CPU 200 has finished processing the IRQ7 interrupt request.

Hence, the register 242 effectively resets the priority of an interrupt request generated by a VIC lower in the daisy chain, in this example VIC 220, to the value programmed in that register. The user could change the value in the register 242 during the lower level interrupt to allow higher level interrupts to be serviced, but it will be appreciated that this adds overhead to the interrupt service routine. Hence, it can be seen with both of these prior art techniques that VICs higher in the daisy chain will block higher level interrupts than the one currently being serviced when those higher level interrupts are generated by a VIC lower in the daisy chain.

It is an object of the present invention to provide a technique which alleviates such blocking problems.

SUMMARY OF THE INVENTION

Viewed from a first aspect, the present invention provides an interrupt controller for prioritising interrupt requests generated by a plurality of interrupt sources, comprising: an interrupt source interface operable to receive interrupt requests generated by a first plurality of interrupt sources; a daisy chain interface operable to receive a daisy chain interrupt request output by a further interrupt controller based on a second plurality of interrupt requests generated by a second plurality of interrupt sources, the daisy chain interface including a priority input operable to receive a daisy chain priority signal indicating a priority associated with the daisy chain interrupt request; prioritisation logic operable to receive the daisy chain priority signal and to apply predetermined prioritisation criteria to determine a highest priority interrupt request selected from the daisy chain interrupt request and the interrupt requests generated by the first plurality of interrupt sources; and an output interface operable to output the highest priority interrupt request, the output interface including a priority output operable to provide an output priority signal indicating a priority associated with the highest priority interrupt request.

In accordance with the present invention, the daisy chain interface includes a priority input for receiving a daisy chain priority signal indicating a priority associated with the daisy chain interrupt request. Further, the prioritization logic is operable to take the daisy chain priority signal into account when applying predetermined prioritization criteria to determine the highest priority interrupt request received from both the daisy chain interrupt request and any interrupt requests received directly via the interrupt source interface. Further, the output interface includes a priority output operable to provide an output priority signal indicating a priority associated with the highest priority interrupt request, thereby enabling this priority information to be propagated to any other interrupt controllers higher in the daisy chain.

Hence, the priority of the active interrupt received as a daisy chain interrupt request at the daisy chain interface can be used to avoid the prioritization logic within the interrupt controller from applying a different prioritization to that daisy chain interrupt request, and hence alleviate the earlier described blocking problems associated with the prior art techniques.

In accordance with the present invention, as well as passing the usual interrupt request signals from the interrupt controller to any next interrupt controller in the daisy chain, the priority level of the output interrupt request is also output, thereby allowing the interrupt request with the highest priority from any VIC in the daisy chain to be output to a processor for servicing rather than being blocked (assuming that interrupt request has a higher priority than any interrupt request currently being serviced by the processor).

The solution of the present invention is very scalable, since typically the interrupt controller and further interrupt controller will have the same structure, and accordingly a number of interrupt controllers of the same structure can be daisy chained together as required dependent on the number of interrupt requests to be handled.

It will be appreciated that there are a number of ways in which the prioritization logic may be arranged to take account of the daisy chain priority signal when applying the predetermined prioritization criteria. However, in preferred embodiments the prioritization logic comprises: a priority encoder operable to determine an initial highest priority interrupt request selected from the interrupt requests generated by the first plurality of interrupt sources; and determination logic operable to determine the highest priority interrupt request selected from the initial highest priority interrupt request and the daisy chain interrupt request. Hence, the priority encoder performs a standard priority encoding function based solely on the interrupt requests received directly by the interrupt controller from interrupt sources, in order to determine an initial highest priority interrupt request, whilst determination logic is then used to determine the actual highest priority interrupt request by comparing the initial highest priority interrupt request with the daisy chain interrupt request.

In preferred embodiments, the priority encoder is operable to generate an initial priority signal indicating a priority associated with the initial highest priority interrupt request, and the determination logic is operable to compare the initial priority signal with the daisy chain priority signal in order to determine the highest priority interrupt request.

In such preferred embodiments, the determination logic is preferably operable to generate the output priority signal to be output via the output interface. Hence, in such embodiments, the output priority signal is generated directly when determining the highest priority interrupt request.

In preferred embodiments, the interrupt controller is a vectored interrupt controller (VIC) and further comprises a storage for storing for each of the interrupt requests generated by the first plurality of interrupt sources an associated vector address identifying an interrupt routine to be executed by a processor to process that interrupt request, the daisy chain interface including a vector address input operable to receive a daisy chain vector address signal indicating a daisy chain vector address associated with the daisy chain interrupt request, and the output interface including a vector address output operable to provide an output vector address signal indicating an output vector address associated with the highest priority interrupt request.

The storage may have a separate vector address entry for each of the interrupt requests generated by the first plurality of interrupt sources, or alternatively several interrupt requests may share one interrupt service routine and hence share a single vector address entry in the storage. The interrupt service routine is then responsible for determining what processing to perform for any particular interrupt request. This latter approach is sometimes used in designs where small circuit size is critical.

It will be appreciated that there are a number of ways in which the output vector address can be selected. However, in preferred embodiments, the interrupt controller further comprises: an initial vector address selector operable to select from the storage an initial vector address associated with the initial highest priority interrupt request determined by the priority encoder; and an output vector address selector operable to receive the initial vector address and the daisy chain vector address, and to select as the output vector address the vector address associated with the highest priority interrupt request determined by the determination logic. Hence, the initial vector address selector selects in a standard manner a vector address from the storage dependent on the output from the priority encoder, in preferred embodiments this selected vector address being deemed to be an initial vector address. An output vector address selector is then used to select as the actual output vector address either the initial vector address or the daisy chain vector address dependent on the highest priority interrupt request determined by the determination logic. In preferred embodiments both the initial vector address selector and the output vector address selector are formed by multiplexers.

In preferred embodiments, the determination logic is operable to generate a drive signal to control the output vector address selector.

In one preferred embodiment, the interrupt controller as described above is connected via the output interface with a processor used to process the highest priority interrupt request, i.e. the interrupt controller is the highest interrupt controller in the daisy chain. In such embodiments, the interrupt controller preferably further comprises: current priority logic for storing the priority associated with a current highest priority interrupt request output by the output interface, the current priority logic being responsive to an acknowledgement signal from the processor indicating that the current highest priority interrupt request has been accepted by the processor as an accepted interrupt request to generate a mask signal identifying the priority stored in the current priority logic; and mask logic operable, during processing of the accepted interrupt request by the processor, to suppress generation at the output interface of any interrupt requests having a priority lower than, or the same as, that of the accepted interrupt request.

In preferred embodiments, for any other interrupt controllers lower down the daisy chain that are also constructed as described above, the current priority logic and mask logic is disabled or not used, such that it is only the current priority logic and the mask logic within the interrupt controller highest in the daisy chain that is used to perform any blocking function. The acknowledgement signal from the processor is preferably only passed to this interrupt controller highest in the daisy chain, and is not propagated back to any other interrupt controllers lower in the daisy chain, since the priority stored by the current priority logic in the interrupt controller highest in the daisy chain will be the priority of the interrupt request with the highest level for the whole daisy chain.

In preferred embodiments, the mask logic comprises: first mask logic associated with the interrupt source interface and operable to prevent any interrupt requests with a priority lower than, or the same as, that of the accepted interrupt request from being processed by the prioritisation logic; and second mask logic associated with the daisy chain interface and operable to prevent any daisy chain interrupt request with a priority lower than, or the same as, that of the accepted interrupt request from being processed by the prioritisation logic.

Whilst the above approach is one approach for handling the masking of interrupt requests from daisy chained interrupt controllers, other approaches can be used. For example, in one embodiment, the mask signal generated by the current priority logic is propagated to the further interrupt controller such that the further interrupt controller will only generate the daisy chain interrupt request if one of the second plurality of interrupt requests has a priority higher than the accepted interrupt request. In this embodiment, the mask logic is associated with the interrupt source interface and is operable to prevent any interrupt requests generated by the first plurality of interrupt sources that have a priority lower than, or the same as, that of the accepted interrupt request from being processed by the prioritisation logic.

In a typical daisy chain approach such as that discussed earlier with reference to FIG. 1, the number of clock cycles that are required for the propagation of interrupt request signals through the daisy chain typically increases by one clock cycle for each extra level of daisy chain. Whilst the propagation delay of the signals has been acceptable with traditional vectored interrupt systems, the interrupt processing of recent microprocessors is much faster than it previously was, and can deal with the vector address within a few cycles after an interrupt is asserted. If the traditional daisy chain coupling technique is used, the CPU will have to wait for the vector address to propagate through each element of the daisy chain. Further, the longer the daisy chain, the longer the time delay within the logic gate/transistor circuits of each interrupt controller, which may lead to a design that cannot operate in a high clock frequency system.

In one embodiment of the present invention, this impact is alleviated by arranging the interrupt controller to further comprise a plurality of said daisy chain interfaces to allow a plurality of said further interrupt controllers to be connected to the interrupt controller, each further interrupt controller being operable to generate a daisy chain interrupt request and associated daisy chain priority signal based on a corresponding plurality of interrupt requests received by that further interrupt controller, the prioritisation logic being operable to receive each daisy chain priority signal and to apply the predetermined prioritisation criteria to determine a highest priority interrupt request selected from the daisy chain interrupt requests and the interrupt requests generated by the first plurality of interrupt sources.

By providing multiple daisy chain interfaces within the interrupt controller, the length of the daisy chain can be significantly reduced, and accordingly the above described delays can be reduced. It will be appreciated that such an approach can be used to reduce latency in a daisy chained architecture irrespective of whether the interrupt controllers in that daisy chained architecture employ the priority signal propagation techniques of preferred embodiments of the present invention.

In such embodiments that provide multiple daisy chain interfaces, then preferably the determination logic is operable to compare the initial priority signal with the daisy chain priority signals received at each daisy chain interface in order to determine the highest priority interrupt request.

Further, the output vector address selector is preferably operable to receive the initial vector address and the daisy chain vector addresses received at each daisy chain interface, and to select as the output vector address the vector address associated with the highest priority interrupt request determined by the determination logic.

Further, in such embodiments, the second mask logic is preferably associated with each daisy chain interface and is operable to prevent any daisy chain interrupt request with a priority lower than, or the same as, that of the accepted interrupt request that is received by the associated daisy chain interface from being processed by the prioritisation logic.

It will be appreciated that the priority input of the daisy chain interface can be embodied in a variety of ways. For example, it may be possible to derive the daisy chain priority signal directly from the daisy chain vector address signal, and in such embodiments the priority input may form part of the vector address input of the daisy chain interface. However, in preferred embodiments, the priority input of the daisy chain interface comprises a separate set of input pins operable to receive the daisy chain priority signal. Furthermore, in preferred embodiments, the priority output of the output interface comprises a separate set of output pins operable to provide the output priority signal. The set of input pins may be one or more pins, as may the set of output pins.

Viewed from a second aspect, the present invention provides a data processing apparatus comprising: a processor for processing interrupts; and a series of daisy chained interrupt controllers for prioritizing interrupt requests generated by a plurality of interrupt sources, at least one of the interrupt controllers being an interrupt controller in accordance with the first aspect of the present invention.

Viewed from a third aspect, the present invention provides a method of prioritising interrupt requests generated by a plurality of interrupt sources, comprising the steps of: (a) receiving at an interrupt source interface interrupt requests generated by a first plurality of interrupt sources; (b) receiving at a daisy chain interface a daisy chain interrupt request based on a second plurality of interrupt requests generated by a second plurality of interrupt sources, and a daisy chain priority signal indicating a priority associated with the daisy chain interrupt request; (c) with reference to the daisy chain priority signal, applying predetermined prioritisation criteria to determine a highest priority interrupt request selected from the daisy chain interrupt request and the interrupt requests generated by the first plurality of interrupt sources; and (d) outputting from an output interface the highest priority interrupt request, and an output priority signal indicating a priority associated with the highest priority interrupt request.

BRIEF DESCRIPTION OF THE DRAWINGS

The present invention will be described, further by way of example only, with reference to a preferred embodiment thereof as illustrated in the accompanying drawings, in which:

FIG. 2A is a block diagram illustrating a first prior art daisy chained arrangement;

FIG. 2B is a block diagram illustrating a second prior art daisy chained arrangement;

DESCRIPTION OF PREFERRED EMBODIMENTS

Before discussing embodiments of the present invention in detail, the basic operation of a known VIC will now be described with reference to FIG. 3.

Figure 1:
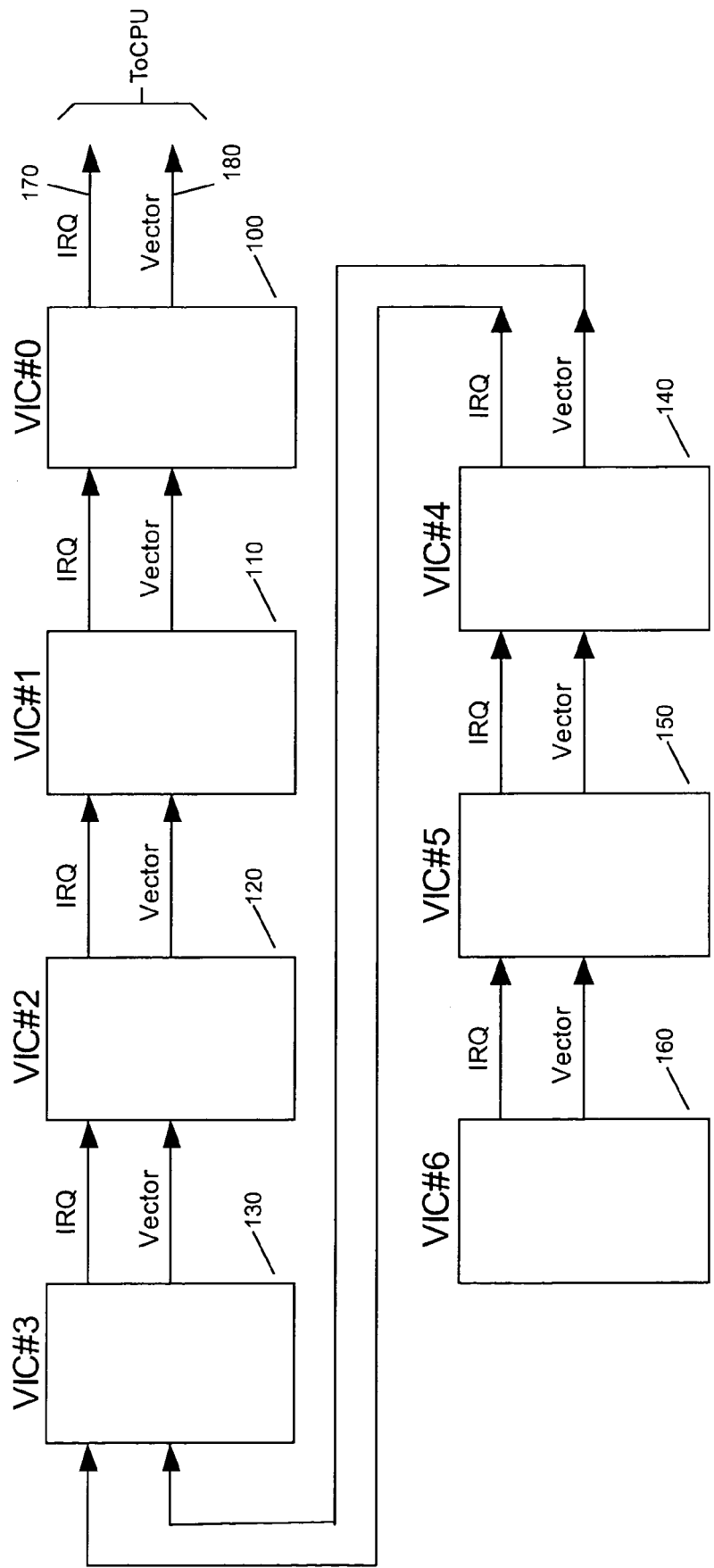
FIG. 1 is a block diagram illustrating a daisy chained arrangement of VICs.

Any interrupt requests from interrupt sources directly connected to the VIC 300 will be received over paths 302 at an enable/masking block 305. In addition, any daisy chain interrupt request received from a VIC to which the VIC 300 is connected in a daisy chain arrangement (such as that described earlier with reference to FIG. 1) will also be received by the enable/masking logic 305. The enable/masking logic 305 can be programmed to indicate whether certain interrupt sources are to be enabled or disabled, any interrupt requests received from disabled interrupt sources being disregarded by the logic 305, and accordingly not propagated to the rest of the elements within the VIC 300. The masking operation performed by the logic 305 will be discussed in more detail later.

Assuming an interrupt request is from an enabled interrupt source, and is not masked by the masking function, then that interrupt request will be output to the OR gate 320 and to the priority encoder 325. Accordingly, in the presence of any interrupt requests output by the enable/masking logic 305, the OR gate 320 will output an interrupt request on path 360.

The priority encoder employs predetermined prioritization criteria in order to determine which of the potentially multiple requests output by the enable/masking logic 305 has the higher priority. Typically, for each possible input to the priority encoder, the priority encoder will have an associated priority level associated therewith, which may be programmable or may be pre-set. Typically there will be a range of possible priority levels, in one example the range extending from hexadecimal 0 up to hexadecimal F, and each interrupt source will have associated with it within the priority encoder 325 a priority level within that range. As mentioned earlier with reference to FIG. 2B, the priority level associated with the daisy chain interrupt request received over path 310 may be pre-set, or may be specified within a priority register accessible by the priority encoder 325.

When the priority encoder 325 has determined the highest priority request from amongst those output by the enable/masking logic 305, it will output a control signal to the multiplexer 335 to cause it to output a corresponding vector address over path 365. A vector address storage 330 will be provided for storing the vector addresses corresponding to each of the interrupt sources that may directly issue interrupt requests to the VIC 300 over paths 302. Each interrupt source may have a separate vector address specified, or some interrupt sources may share vector addresses (in which case the same interrupt service routine will be shared by those interrupt sources).In the example illustrated in FIG. 3 where there are four interrupt sources directly connected to the VIC 300, there are a corresponding four vector addresses stored within the vector address storage 330 (i.e. each interrupt source has its own interrupt service routine associated therewith).

In addition, the multiplexer will receive over path 332 a daisy chain vector address as output by the VIC within the daisy chain that the VIC 300 is arranged to receive an interrupt request from.

Figure 3:
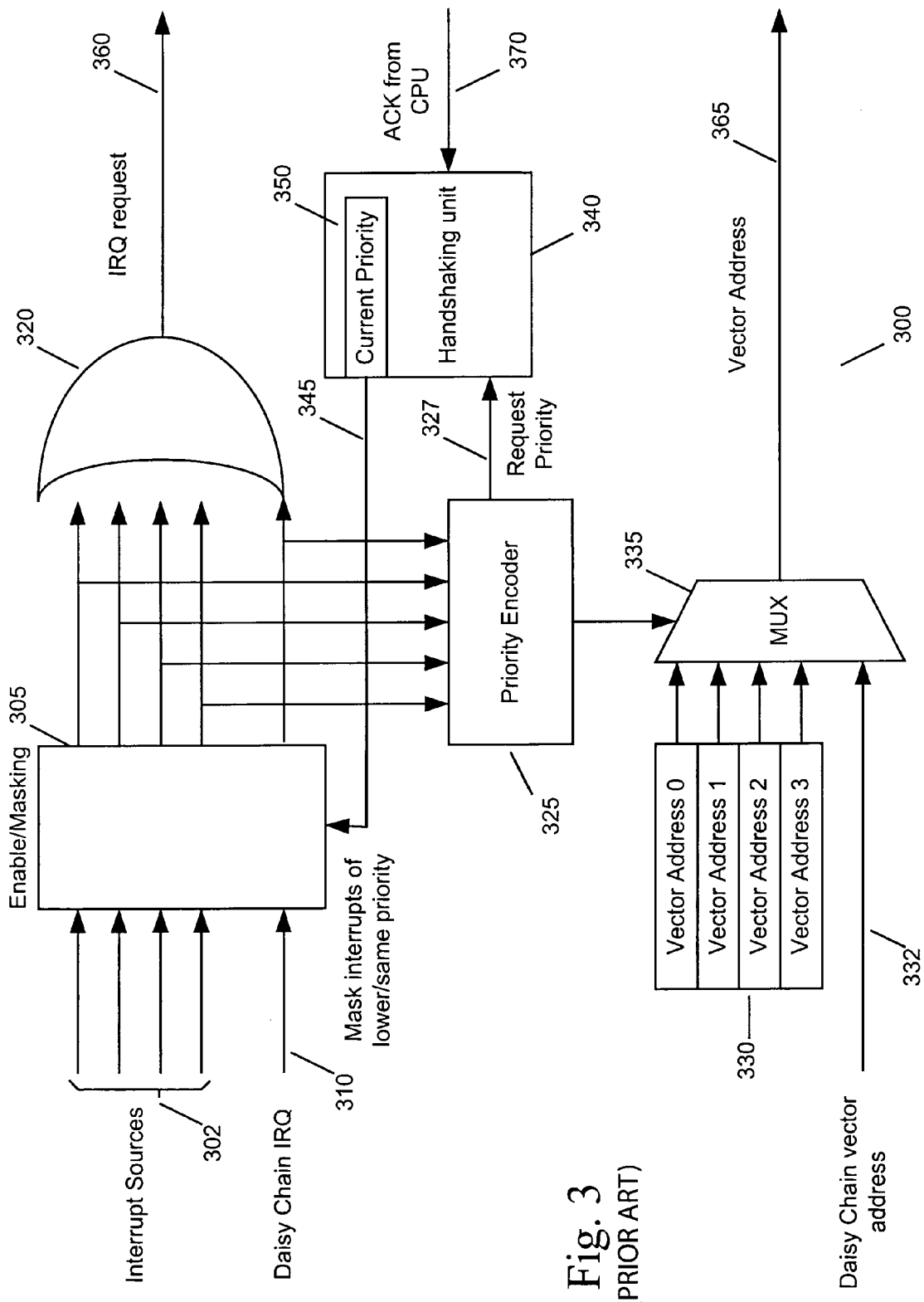
FIG. 3 is a block diagram illustrating in more detail the elements of a conventional VIC that may be used in a daisy chained arrangement.

Hence, as can be seen from FIG. 3, assuming an enabled and non-masked interrupt request is received by the VIC 300, this will result in an interrupt request being output on path 360 and a corresponding vector address being output on path 365, these signals being passed to the CPU if the VIC is the highest VIC in the daisy chain, or to the next VIC in the daisy chain.

Within the VIC 300, there is also provided a handshaking unit 340 for communicating with the CPU, and in particular for receiving an ACK signal from the CPU over path 370 when the output interrupt request is accepted by the CPU. The handshaking unit 340 is also arranged to receive over path 327 from priority encoder 325 a signal indicating the priority value of the request being output over path 360, that priority value being stored within the current priority register 350.

When the handshaking unit 340 then subsequently receives the ACK from the CPU over path 370, this causes a mask signal to be generated over path 345 to the enable/masking logic 305 identifying the priority stored within the current priority register 350. The enable/masking logic 305 is then responsive to this mask signal to suppress any interrupt request that it receives that has a priority lower than, or the same as, that priority value stored within the current priority register 350. The purpose of this is to ensure that, whilst a particular interrupt request is being handled by the CPU, the VIC 300 does not propagate any other interrupt requests that have a lower or the same priority as that interrupt request currently being handled. However, as will be apparent from the following discussions, this causes a problem when the VIC 300 is used in a daisy chained arrangement.

Figure 4A:
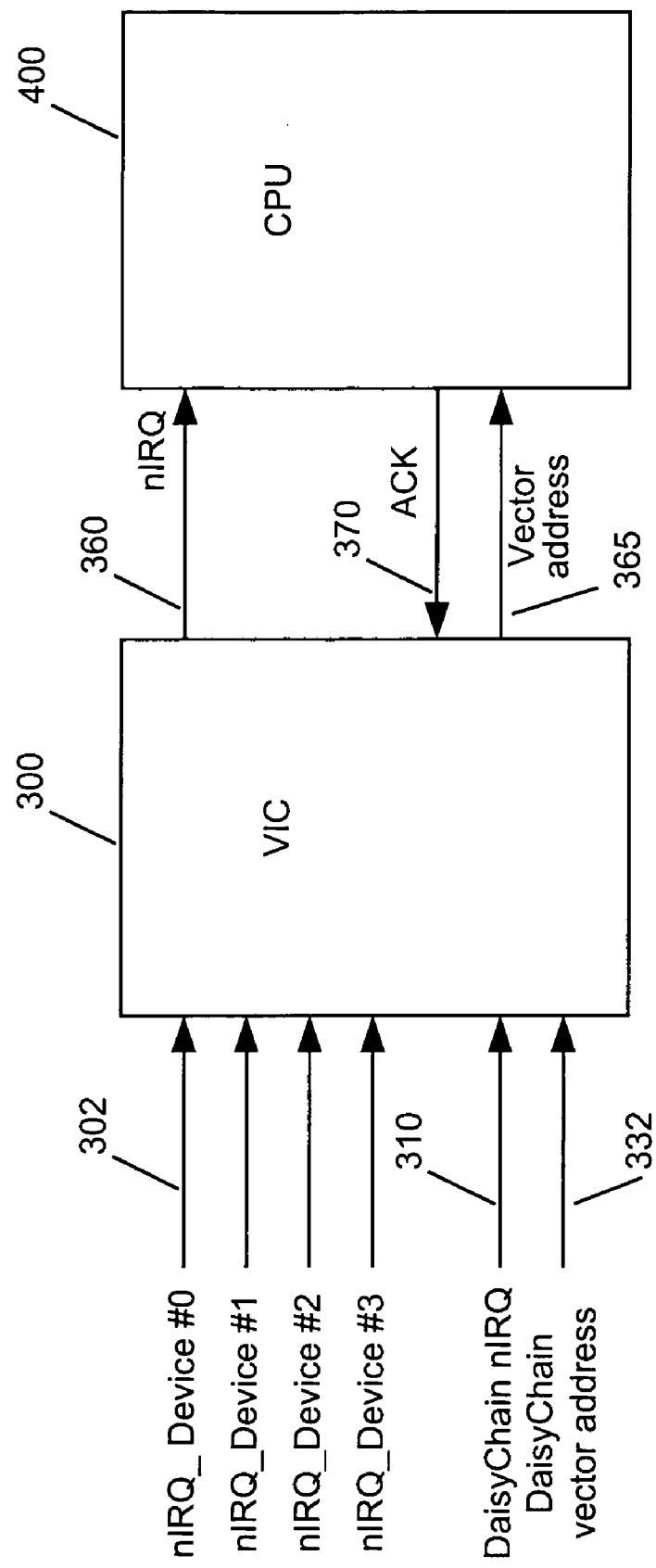
FIGS. 4A and 4B illustrate operation of the VIC of FIG. 3.
Figure 4B:
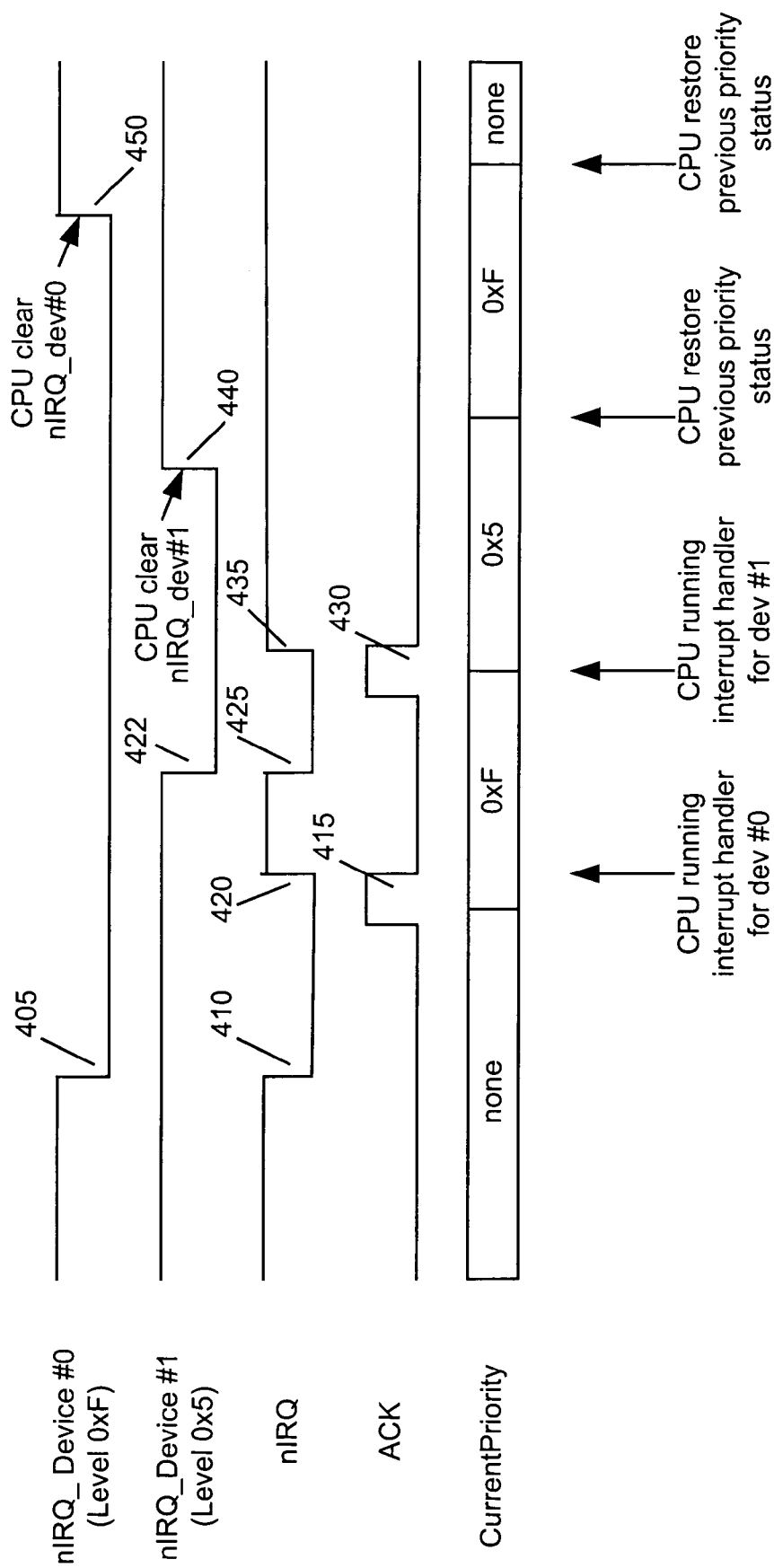

FIGS. 4A and 4B illustrates the operation of the VIC 300 when it is used in a standalone manner to communicate with the CPU 400. In this example, no daisy chained VICs are present, and accordingly no signals will be received over path 310, 332, and instead all interrupt requests will be received over paths 302.

FIG. 4B illustrates an example sequence of interrupts, in which an interrupt request is received by the VIC 300 from device 0, as indicated by the transition 405. This causes a corresponding transition 410 on path 360, thereby asserting an interrupt request to the CPU 400. When an acknowledgement 415 is received over path 370, this causes the interrupt request to be de-asserted, as indicated by the transition 420. Further, the current priority value is at that time set to 0xF, i.e. the priority level of device 0.

When subsequently device 1 asserts an interrupt request, as indicated by the transition 422, then this will cause a corresponding interrupt request to be asserted over path 360, as indicated by the transition 425. When an ACK 430 is received back from the CPU 400, this causes the interrupt request to be de-asserted, as indicated by transition 435, at which time the CPU interrupts the processing of the interrupt routine for device 0 and instead begins running the interrupt routine for device 1. At this time, the current priority value is updated to 0x5, namely the priority level of device 1.

Hence, any subsequent interrupt requests will be suppressed by the enable/masking logic 305 unless their priority level exceeds 0x5. During the interrupt service for device 1, typically near the end of the interrupt service routine, the CPU 400 will send a signal to device 1 to cause it to de-assert the interrupt request as indicated by the transition 440, and at the end of the interrupt service routine the CPU will access the VIC, for example using the memory interface, to restore the previous priority status within the current priority register 350, after which the CPU will continue to run the interrupt handling routine for device 0. At this time, the enable/masking logic 305 will only suppress any subsequent interrupts assuming that their priority level is lower than or the same as, that of device 0, in this example 0xF. During the interrupt service for device 0, the CPU will send a signal to device 0 causing it to clear its interrupt request, as indicated by the transition 450, and at the end of the interrupt service routine, the CPU will restore the previous priority status within the current priority register 350, in this example, this causing the priority status to be updated to "none".

Whilst this approach works well when the VIC 300 is used in isolation, the process is not ideal when the VIC 300 is used in a daisy chain arrangement, as will be illustrated in more detail with reference to FIGS. 5A and 5B. As can be seen from 5A, the VIC 300 is the highest VIC in the daisy chain, it being arranged to receive a signals output from the VIC number 1 500, which in turn can receive signals output by VIC number 2 510.

Assuming no interrupts are currently being processed by the CPU, and device number 2 then issues an interrupt request over path 515 to VIC 510, this will cause a daisy chain interrupt request to be propagated over path 520 to VIC 500, and from there over path 310 to VIC 300, along with a corresponding vector address output over paths 525, 332, respectively. This will then result in the interrupt request being output over paths 360 to the CPU along with the corresponding vector address being output over path 365 to the CPU. Accordingly, as can be seen in FIG. 5B, when device 2 asserts the interrupt as indicated by the transition 540, this will result in a corresponding interrupt being issued by VIC 300 to the CPU, as indicated by transition 545. In practice, there will be some delay between the assertion of the interrupt by device 2 and the output of that interrupt to the CPU, due to the daisy chained architecture.

When the CPU sends an acknowledgement 550 back to VIC 300, this will cause the interrupt request on path 360 to be de-asserted, as indicated by the transition 555. Further, the value in the current priority register 350 will be set to 0xF, since in this example VIC 300 will treat all daisy chain interrupt requests received over paths 310 as having the priority value 0xF.

When device 1 subsequently issues an interrupt request over path 505 to VIC 500, as indicated by the transition 560 in FIG. 5B, then this will cause a daisy chain interrupt request to be issued over path 310 to the VIC 300, along with the corresponding vector address over path 332. However, the enable/masking logic 305 within VIC 300 will be arranged to mask any interrupt request having a priority value less than or equal to 0xF, and as all daisy chain interrupt requests received over paths 310 will be deemed to have the priority value 0xF, this will result in suppression of the interrupt request from device 1 even though in this example the interrupt request from device 1 actually has priority of 0x1, which is higher than the priority of device 2 (0x5).

During the interrupt service for device 2, the CPU will send a signal to device 2 to cause it to de-assert its interrupt, as indicated by the transition 562. Further, at the end of the interrupt service routine, the CPU will restore the previous priority status in the current priority register 350, in this example the previous priority status being "none". Accordingly the enable/masking logic 305 will no longer mask the daisy chain interrupt request, and accordingly VIC 300 will, as indicated by the transition 565, output a new interrupt request to the CPU corresponding to the interrupt request issued by device 1. When an acknowledgement 570 is received back from the CPU, the interrupt request on path 360 will be de-asserted, as indicated by the transition 575, and again the current priority in the register 350 will be set to 0xF, i.e. the value associated with all daisy chain interrupt requests. During the interrupt service for device 1, the CPU will send a signal to device 1 causing it to de-assert the interrupt request as indicated by the transition 580, and also, at the end of the interrupt service routine, the CPU will restore the previous priority status in the current priority register 350.

Figure 5A:
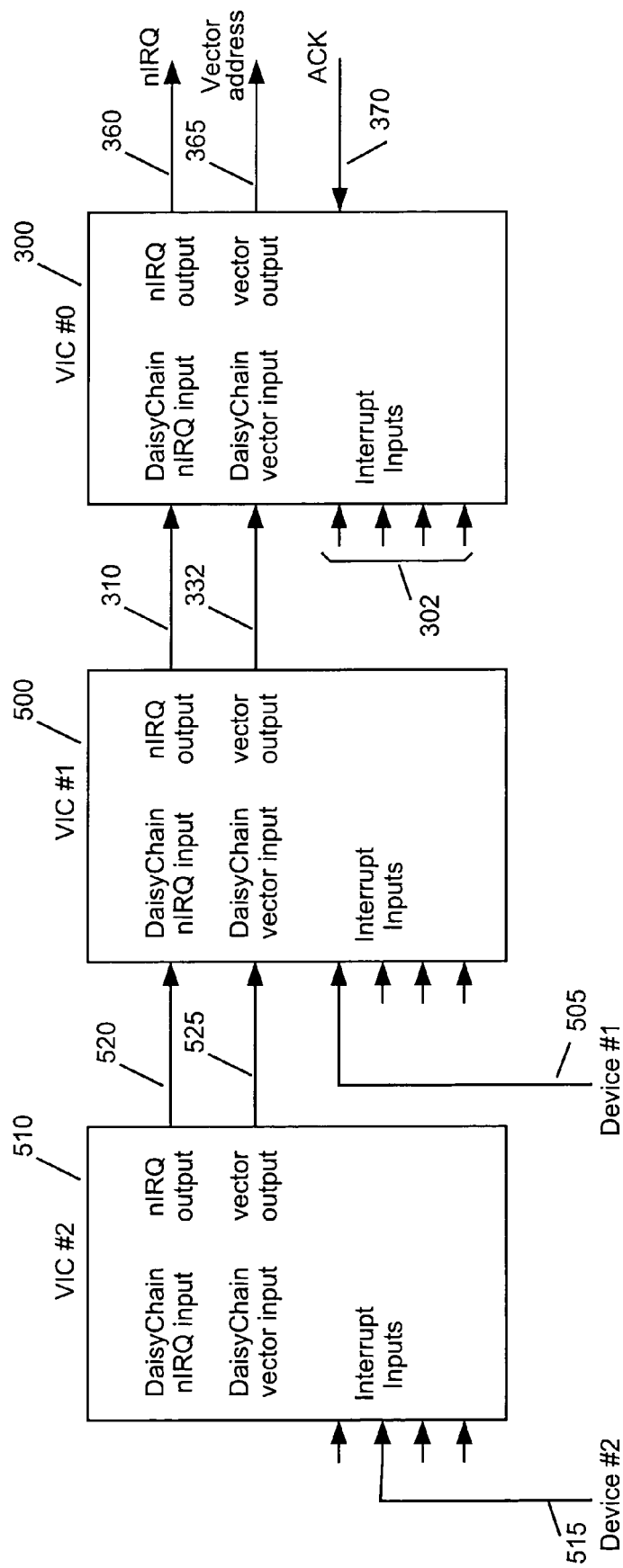
FIGS. 5A and 5B illustrate the operation of the VIC of FIG. 3 when used in a daisy chained arrangement.
Figure 5B:
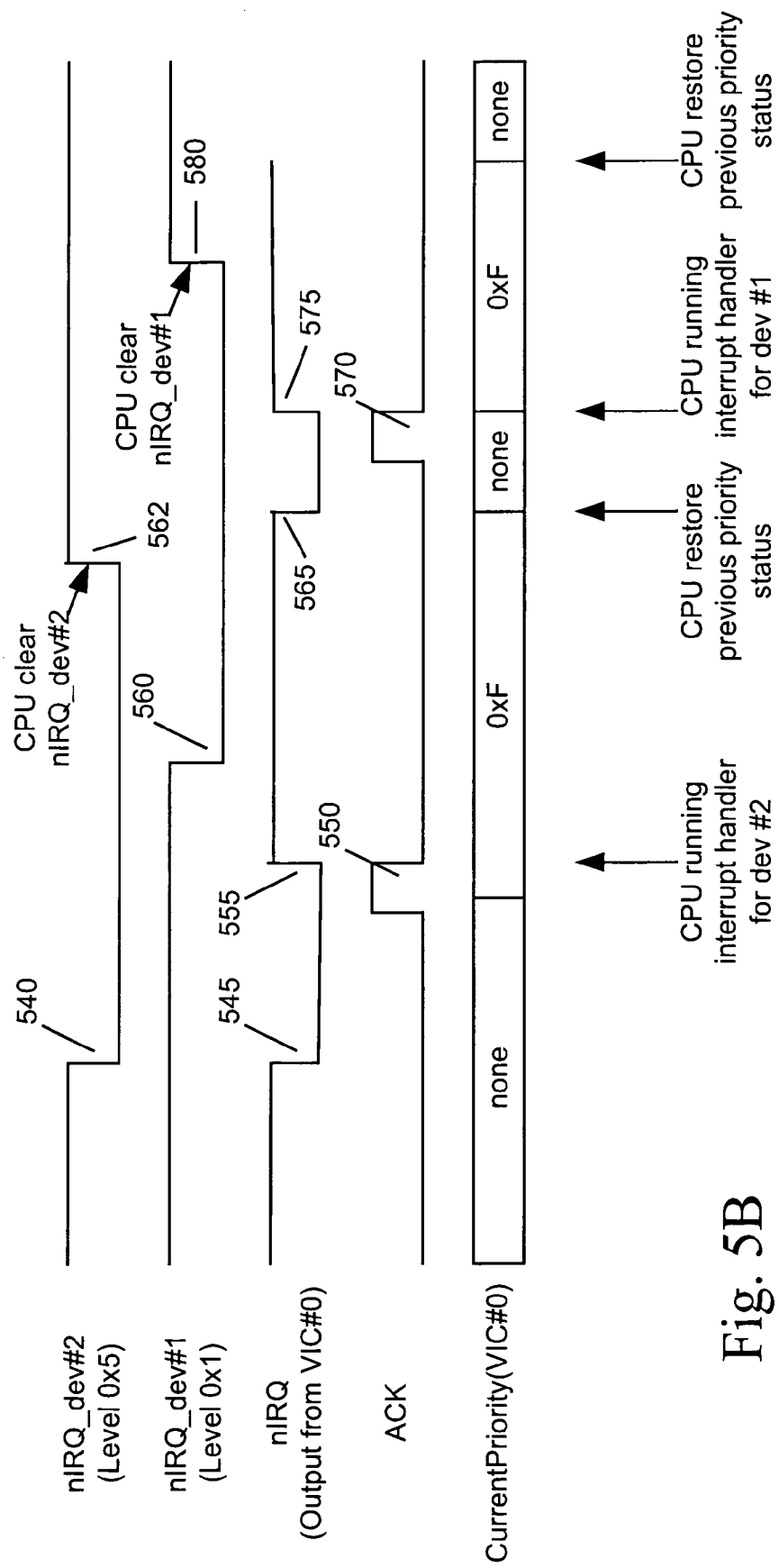

Hence, as can be seen from FIGS. 5A and 5B, the higher priority interrupt request from device 1 was blocked whist the interrupt request for device 2 was being handled by the CPU, thus resulting in a significant delay in handling the high priority interrupt request from device 1.

This problem is alleviated in preferred embodiments of the present invention through the propagation of priority information through the daisy chain, and the appropriate handling of that priority information within each VIC in the daisy chain. The basic arrangement of one embodiment of the present invention is illustrated schematically in FIG. 6.

Figure 6:
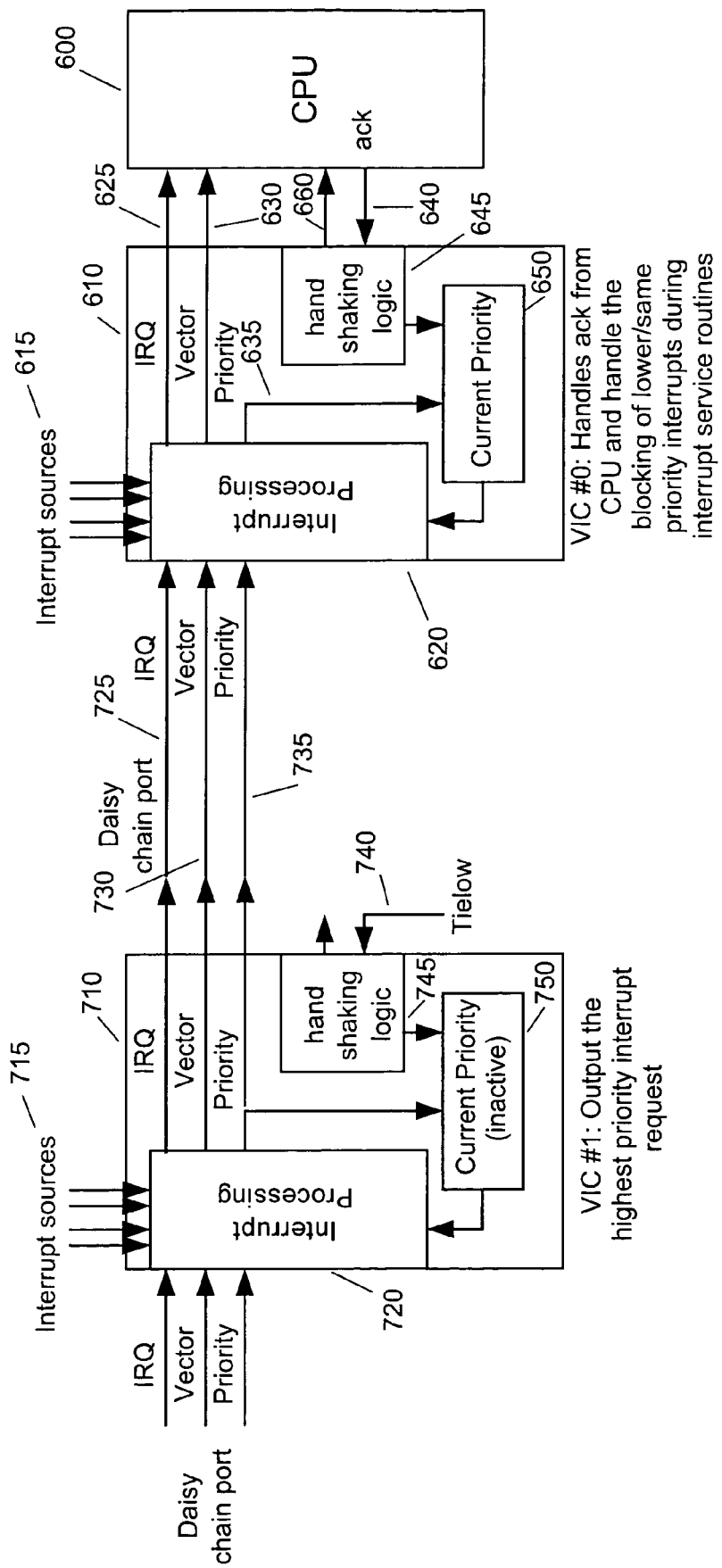
FIG. 6 is a block diagram illustrating the operation of VICs in accordance with an embodiment of the present invention.

As can be seen from FIG. 6, a first VIC 610 is coupled to a CPU 600, that is arranged to output an interrupt request over path 625 to the CPU 600, along with an associated vector address over path 630. When the interrupt request is accepted, this results in the generation of an acknowledgement over path 640 to the handshaking logic 645. In return, VIC 610 asserts a "Address Valid" signal 660 to inform the CPU that the value on the vector path 630 is currently stable and can be accessed. This handshaking prevents the CPU from reading the vector address from path 630 when the vector address signal is changing, e.g. when a higher priority interrupt request has just arrived. At the same time as the handshaking is performed, the priority associated with the interrupt request is passed over path 635 to the current priority logic 650 (which in preferred embodiments can be considered as being part of the handshaking logic 645), and on receipt of the acknowledgement from the CPU, this results in the generation of a mask signal output from the current priority logic 650 to the interrupt processing logic 620.

Details of the interrupt processing logic 620 will be described later with reference to FIG. 7. It is arranged to receive interrupt requests over paths 615 from interrupt sources directly connected to the VIC 610 and is also arranged to receive a daisy chain interrupt request over path 725, along with an associated vector address over path 730. However, in contrast to the known VIC described earlier, the interrupt processing logic 620 also receives over path 735 a priority value associated with the daisy chain interrupt request received over path 725, this priority value being generated by the interrupt processing logic 720 within VIC 710 with which VIC 610 is coupled. Hence, in accordance with preferred embodiments of the present invention, as well as passing the interrupt request and the corresponding vector address to the next VIC in the daisy chain, the priority level of the interrupt request is also passed, this ensuring that the interrupt request with the highest priority from any VIC in the daisy chain will be serviced and not blocked (assuming that interrupt request has a higher priority than any interrupt request currently being serviced by the CPU).

In accordance with preferred embodiments of the present invention, the acknowledgement signal from the CPU is only propagated back to VIC 610 rather than to all of the daisy chained VICs, as the current priority stored within current priority logic 650 will be that of the interrupt request with the highest level for the whole daisy chain. Accordingly, the current priority logic 750 within VIC 710, and indeed within any other lower VICs in the daisy chain, is inactive, and in addition the acknowledgement input into the handshaking logic 745 is inactive, in preferred embodiments by tying that input terminal low. Since the acknowledgement does not have to be propagated, timing issues during synthesis are avoided.

Figure 7:
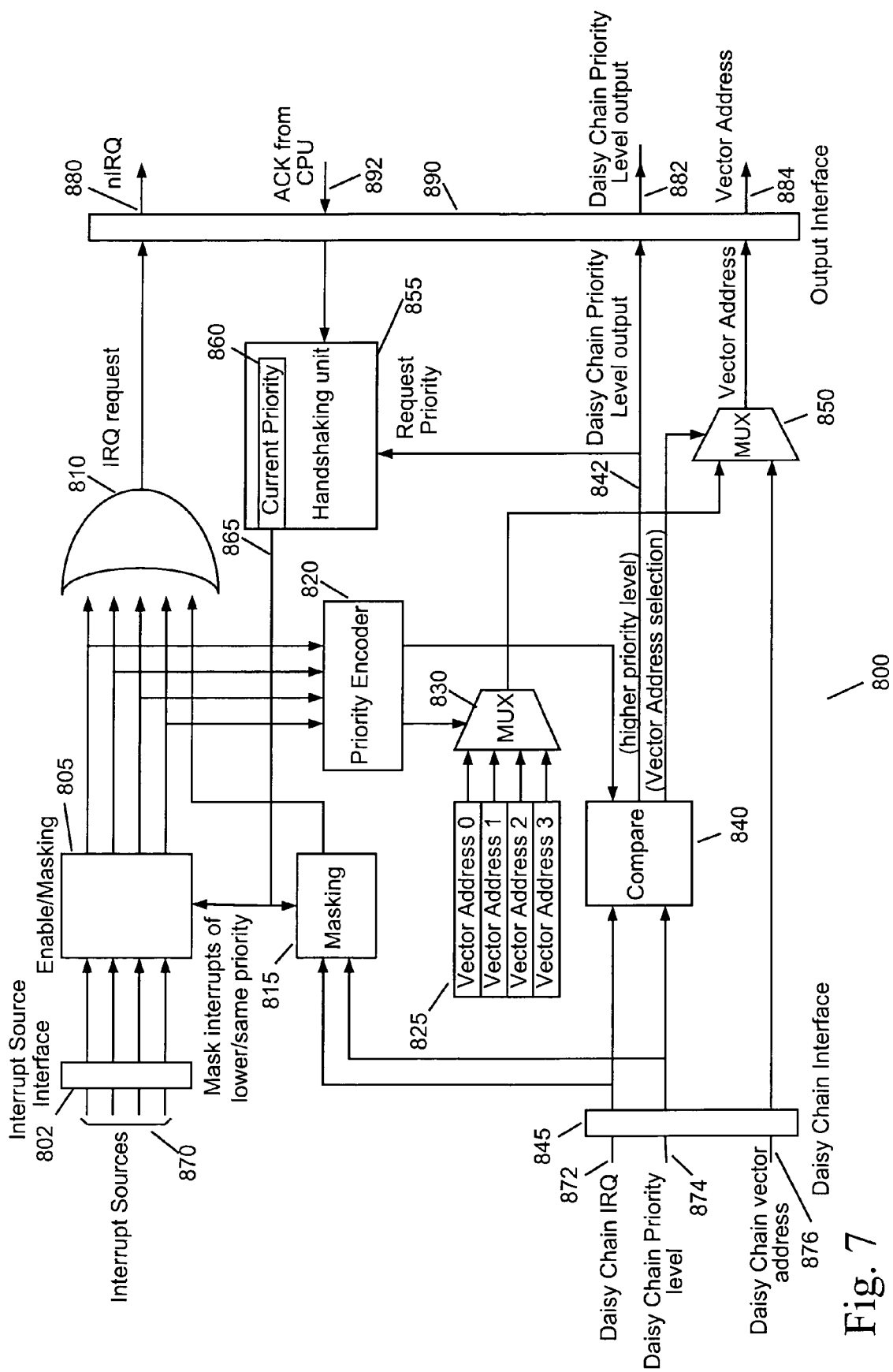
FIG. 7 is a block diagram illustrating the elements provided within a VIC in accordance with an embodiment of the present invention.

More detail of the VIC of an embodiment of the present invention, which may be used to implement VICs 610, 710 in FIG. 6, will now be provided with reference to FIG. 7.

The VIC 800 has enable/masking logic 805 coupled to an interrupt source interface 802 for receiving any interrupt requests over paths 870 from interrupt sources connected directly to that VIC. In contrast to the enable/masking logic 305 in FIG. 3, the enable/masking logic 805 does not receive any daisy chain interrupt requests, such a daisy chain interrupt request being received over path 872 at a daisy chain interface 845, along with a corresponding daisy chain vector address 876, and a daisy chain priority level 874 specifying the priority of that daisy chain interrupt request.

Assuming any interrupts received by the enable/masking logic 805 are enabled and not masked, they will be output to OR gate 810, thereby resulting in an interrupt request being output from the OR gate 810 to the output interface 890 for propagation over path 880. In addition, the outputs from the enable/masking logic are passed to the priority encoder 820 which, as described earlier with reference to FIG. 3, is arranged to apply predetermined prioritization criteria to determine which of the potentially multiple interrupt requests has the highest priority. Again, it should be noted that in contrast in FIG. 3 the priority encoder does not receive any signal corresponding to any daisy chain interrupt request received.

A control signal is then output by the encoder 820 to control the output of multiplexer 830 such that the multiplexer 830 selects from the vector address storage 825 the vector address associated with the interrupt request deemed to have the highest priority by the encoder 820. The priority level of that selected interrupt request is also output from the priority encoder 820 to the comparison logic 840, the comparison logic 840 also being arranged to receive any daisy chain interrupt request received over path 872, and its corresponding priority level received over path 874. The comparison logic 840 compares the priority level output by the priority encoder 820 with the priority level received over path 874, and outputs over path 842 the higher priority level. It also generates a control signal to the multiplexer 850, which receives at its inputs the vector address output by multiplexer 830 and the daisy chain vector address received over path 876. Accordingly if the daisy chain interrupt request is deemed to have the higher priority level, the comparison logic 840 will generate a control signal to the multiplexer 850 to cause the daisy chain vector address to be output to the output interface 890, for propagation over path 884. Otherwise, the comparison logic 840 will cause the multiplexer 850 to select the output from multiplexer 830 as the vector address.

The priority level output by the comparison logic 840 on path 842 is passed to the output interface 890 for propagation over path 882, and is also routed to the handshaking unit 855 for storage within the current priority register 860. When the acknowledgement is received over path 892 from the CPU, this will cause a mask signal to be output over path 865 to the enable/masking logic 805, and to the masking logic 815. The masking logic 815 is provided to control the routing of the daisy chain interrupt request to the OR gate 810, so that in the absence of any masking, a daisy chain interrupt request over path 872 will be routed to the OR gate 810 to cause a corresponding interrupt request to be issued over path 880. When masking is being applied, the masking logic 815 compares the priority level of the daisy chain interrupt request with the priority level encoded within the mask signal, and only forwards the interrupt request on to the OR gate 810 if the daisy chain interrupt request has a priority higher than that encoded within the mask signal. The masking function performed within logic 805 similarly only allows interrupt requests received over paths 870 to be output to the OR gate 810 and the priority encoder 820 if their priority levels exceed the priority level encoded in the mask signal 865.

Figure 8A:
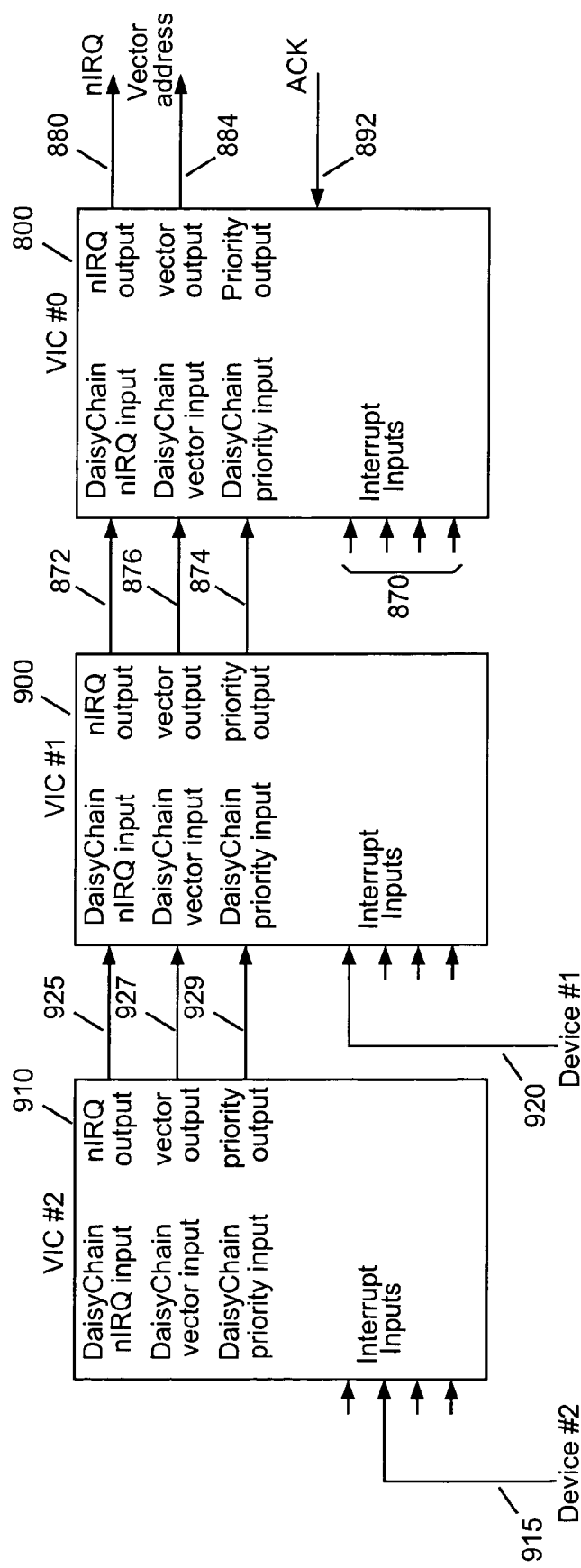
FIGS. 8A and 8B illustrate the operation of the VIC of FIG. 7 when used in a daisy chained arrangement.

The operation of a VIC such as that illustrated in FIG. 7 when used in a daisy chain architecture will now be described with reference to FIGS. 8A and 8B. As can be seen from FIG. 8A, the VIC 800 is the highest VIC in the daisy chain, and further VICs 900, 910 are coupled to it in a daisy chained manner. In preferred embodiments, each of the VICs 800, 900 and 910 are constructed as shown in FIG. 7.

Figure 8B:
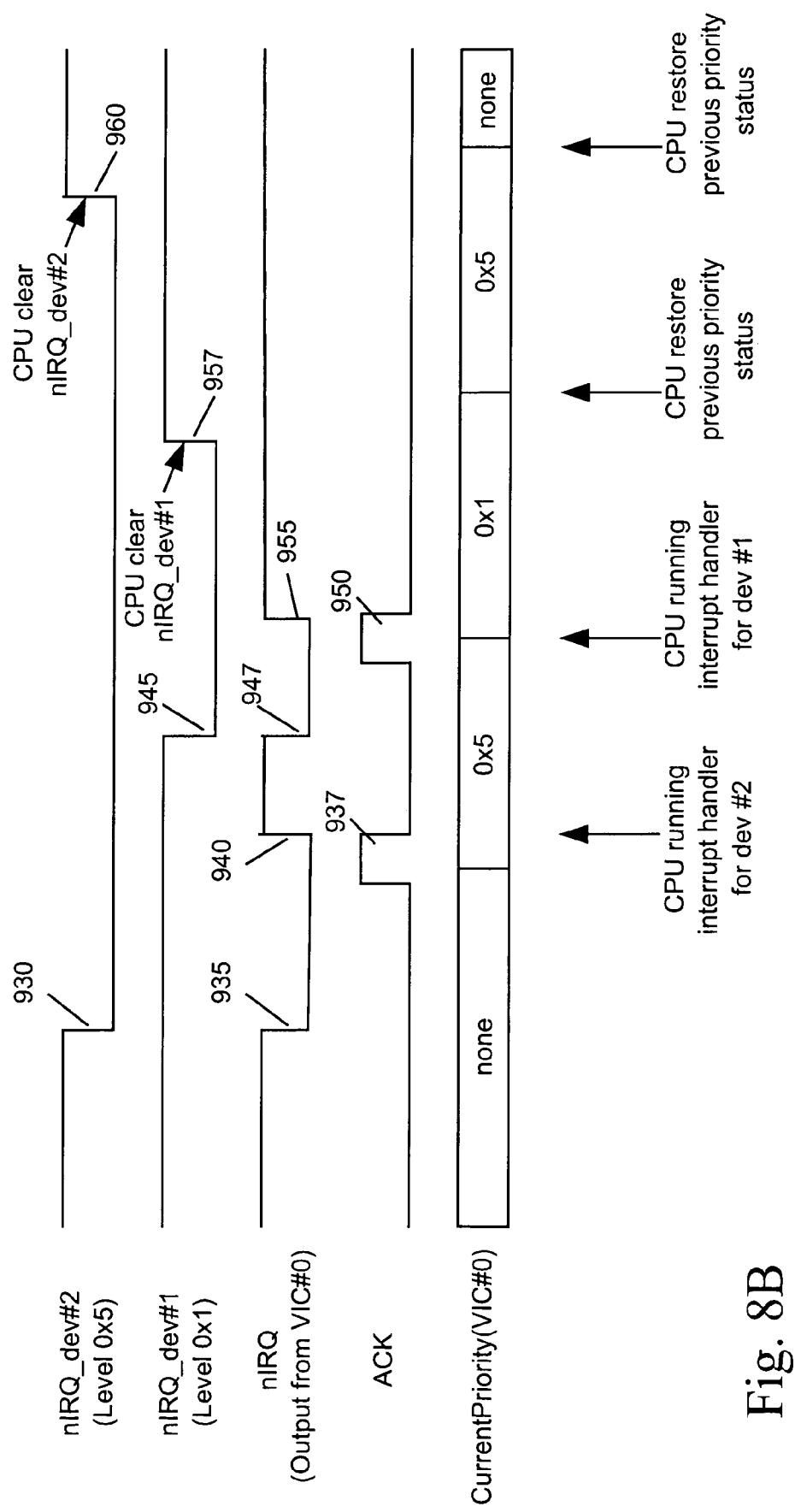

If device 2 asserts an interrupt request over path 915 to VIC 910, as indicated by the transition 930 in FIG. 8B, this will result in the output from VIC 910 of the daisy chain interrupt request over path 925, along with the corresponding vector address over path 927 and a priority value over path 929. In this example, device number 2 has a priority level of 0x5, and accordingly the priority output over path 929 will be 0x5. In the absence of any other received interrupt requests, VIC 900 will then propagate that daisy chain interrupt request over paths 872, 876, 874 respectively. In the absence of any other interrupt requests received over paths 870, the VIC 800 will then issue an interrupt request over path 880 to the CPU, along with the corresponding vector address 884. Although VIC 800 includes a priority output pin as part of its output interface 890, the CPU will not typically be connected to that pin, and accordingly the priority value will not be output to the CPU, this information not being of interest to the CPU. The assertion of the interrupt request over path 880 is indicated by the transition 935 in FIG. 8B.

When an acknowledgement 937 is then received over path 892, this will cause the interrupt request on path 880 to be de-asserted, as indicated by the transition 940 in FIG. 8B. In addition, the current priority value encoded within the mask signal will be updated to the value 0x5 to reflect the priority level associated with the asserted interrupt request.

When device 1 subsequently issues an interrupt request over path 920 to VIC 900, this will cause a corresponding daisy chain interrupt request to be output over path 872, along with an associated vector address over path 876, and a priority level over path 874. The priority level over path 874 will have a value 0x1, this being the priority level associated with device 1. Since the priority level received over path 874 is 0x1, which is higher than the current priority value 0x5 stored in current priority register 860, masking logic 815 will allow the daisy chain interrupt request to be passed to the OR gate 810, thereby causing an interrupt request to be asserted over path 880 to the CPU. In addition, the comparison logic 840 will output the priority level 0x1 which will be stored within the current priority register 860, and will also generate a control signal to cause the multiplexer 850 to output the daisy chain vector address over path 884.

Hence, the assertion of the interrupt request by device 1, as indicated by transition 945 in FIG. 8B, will result in assertion of an interrupt request over path 880 as indicated by transition 947 in FIG. 8B. When an acknowledgement 950 is subsequently received from the CPU over path 892, this will cause the interrupt request on path 880 to be de-asserted, as indicated by the transition 955. At this time, the CPU will interrupt running of the interrupt handler for device 2, and will instead begin running the interrupt handler for device 1. Also at this time, the current priority encoded within the mask signal 865 will be set to 0x1, thereby preventing any subsequent interrupt requests having a priority level of 0x1 or lower from being propagated.

During the interrupt service for device 1, the CPU will send a signal to device 1 to cause it to clear its interrupt request, as indicated by the transition 957, and also, at the end of the interrupt service routine, the CPU will restore the previous priority status in the current priority register 860, thereby restoring the value 0x5. At this time, the CPU will then continue running the interrupt handler for device 2, and during the interrupt service for device 2, the CPU will send a signal to device 2 to cause it to clear its interrupt request, as indicated by the transition 960. Further, at the end of the interrupt service routine, the CPU will then restore the previous priority status within the current priority register 860.

Accordingly, by comparison of FIG. 8B with FIG. 5B, it can be seen that, when the daisy chain includes VICs in accordance with the embodiment of the present invention illustrated in FIG. 7, the higher level interrupt from device 1 will not be blocked whist the lower level interrupt from device 2 is being processed, and accordingly the problem of the prior art as illustrated in FIG. 5B is overcome.

Furthermore, by preventing priority levels being modified in the daisy chain, as occurs with the earlier described prior art techniques, interrupt priority management in software applications or operating systems becomes much easier.

Figure 11:
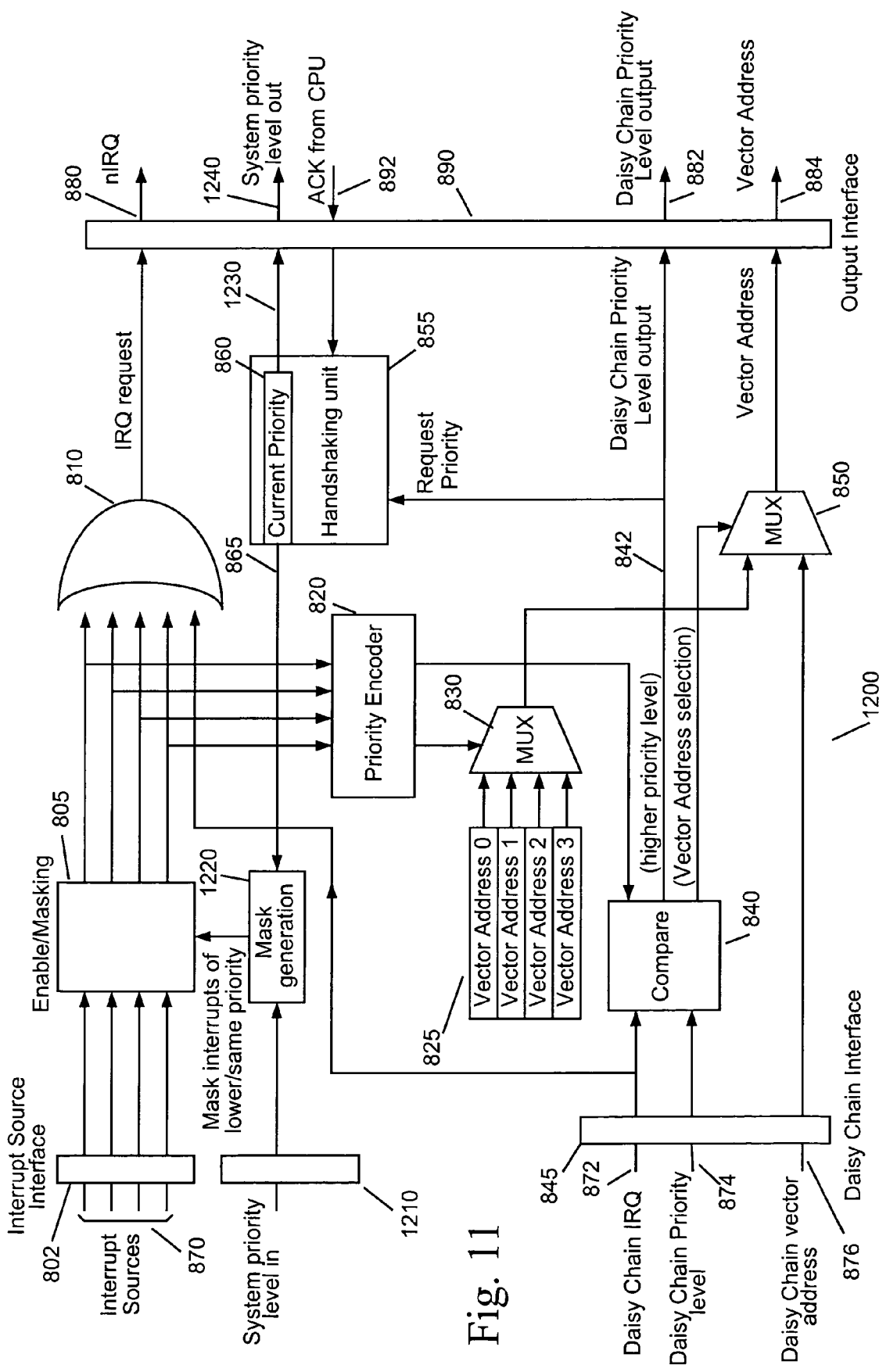
FIG. 11 is a block diagram illustrating the elements provided within a VIC in accordance with another embodiment of the present invention.
Figure 12:
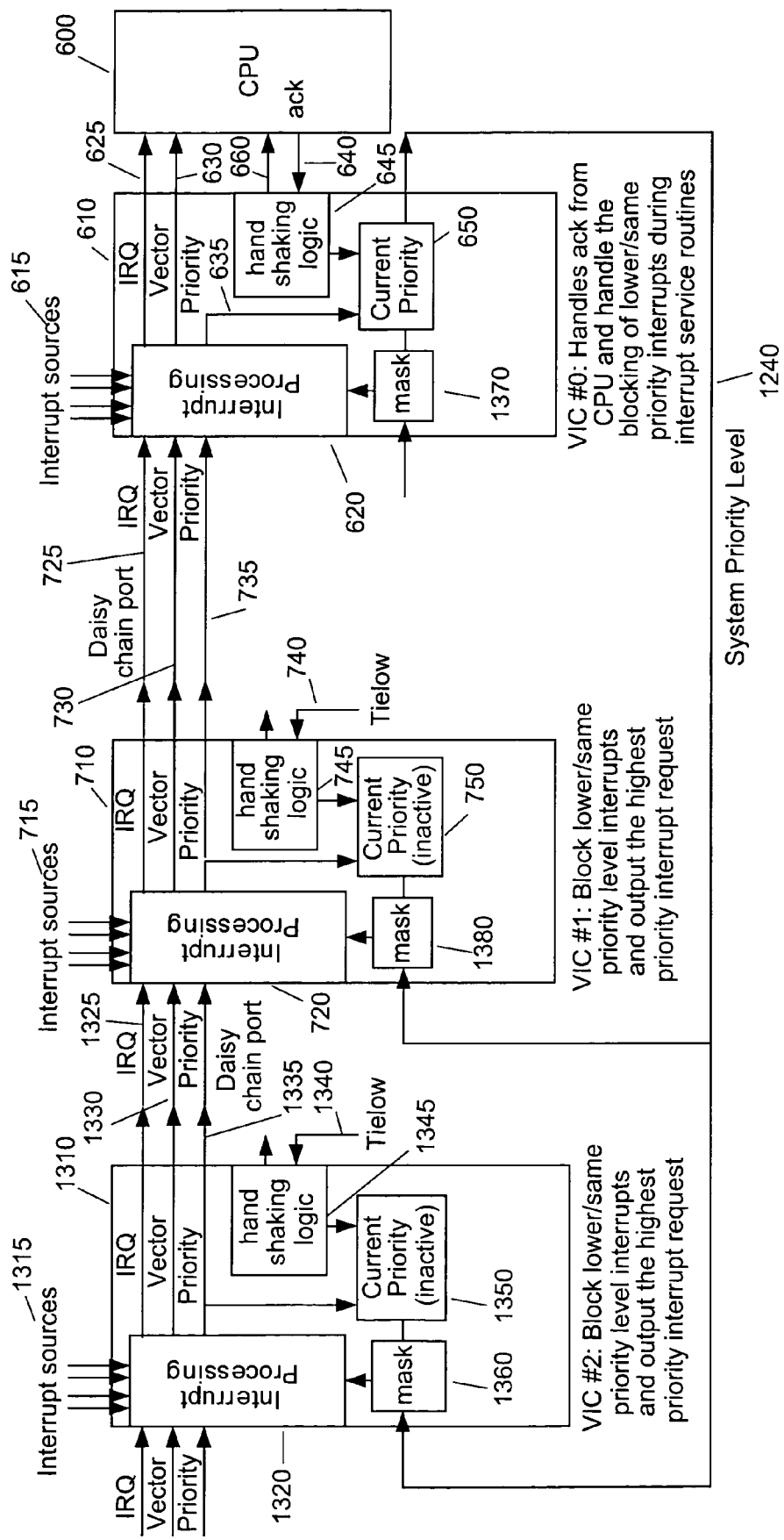
FIG. 12 is a block diagram illustrating the operation of VICs in accordance with the embodiment of FIG. 11.

FIGS. 11 and 12 illustrate an alternative embodiment to that of the VIC of FIGS. 6 and 7. As will be apparent from a comparison of FIG. 11 with FIG. 7, the construction of the VIC 1200 of FIG. 11 is virtually the same as that of VIC 800 of FIG. 7, but the functionality provided to handle masking of interrupt requests from daisy chained VICs is different. In FIG. 11, mask generation logic 1220 is provided in place of the masking logic 815 of the VIC 800, which receives the mask signal 865 from the current priority register 860, and also a system priority level received by the VIC 1200 at the interface 1210. The handshaking unit of the VIC is also able to cause the current priority register 860 to output a system level priority signal over path 1230 to the output interface, from where it can be propagated over path 1240 to other VICs in the daisy chain. The manner in which this functionality is used to manage masking of interrupt requests from daisy chained VICs will now be illustrated with reference to FIG. 12.

FIG. 12 is similar to FIG. 6 discussed earlier, but shows in addition a third VIC 1310 in the daisy chain. Further the VICs 610, 710 and 1310 are each shown as including mask generation logic 1370, 1380, 1360, respectively. The VIC 610 connected to the CPU 600 is operable to cause its current priority status (i.e. the value stored in the current priority register of current priority logic 650) to be output as a system priority level signal over path 1240 to all other VICs in the daisy chain, that system priority level being input to the mask generation logic 1360, 1380 in those other VICs 1310, 710, respectively.

The mask generation logic in each VIC is arranged to generate a mask signal from either the output of that VIC's current priority register or the received system priority level signal. For the VIC 610, the current priority logic 650 is active and the mask generation logic hence uses that internally generated mask signal as the mask signal to pass to the enable/masking logic of that VIC (i.e. with reference to FIG. 11, mask generation logic 1220 outputs the mask signal received over path 865 to the enable/masking logic 805).

For each of the VICs 710, 1310, the current priority logic 750, 1350, respectively, is inactive and the mask generation logic instead uses the system priority level received over path 1240 as the mask signal to pass to the enable/masking logic of that VIC (i.e. with reference to FIG. 11, mask generation logic 1220 outputs the system priority level received at interface 1210 to the enable/masking logic 805 as the mask signal).

The result of this is that the enable/masking logic 805 in each VIC in the daisy chain will only allow an interrupt request to be output from that VIC when the interrupt source generating the interrupt request has a higher priority than the interrupt request currently being processed by the CPU 600.

Hence, the daisy chain priority level information received at the daisy chain interface 845 does not need to be passed to the masking logic and the daisy chain interrupt request can be routed directly to the OR gate 810, since that daisy chain interrupt request will only have been allowed to be propagated by a VIC lower down the daisy chain if its priority is higher than the interrupt request currently being processed by the CPU. However, the daisy chain priority level information is still needed to be received at the daisy chain interface, since it will be needed by the comparison logic 840 to determine whether the daisy chain interrupt request should be output instead of any locally generated interrupt request received by the interrupt source interface 802.

In a typical daisy chain structure, where each VIC may be coupled at its input to one other VIC, and coupled at its output to either another VIC higher in the chain, or to the CPU, the number of clock cycles that are required for the propagation of interrupt request signals through the daisy chain typically increases by one clock cycle for each extra level of daisy chain. Whilst the propagation delay of the signals has been acceptable with traditional vectored interrupt systems, the interrupt processing of recent microprocessors is much faster than it previously was, and can deal with the vector address within a few cycles after an interrupt is asserted. Hence, the requirement for the CPU to have to wait for the vector address to propagate through each element of the daisy chain can result in undesirable latency issues.

Figure 9:
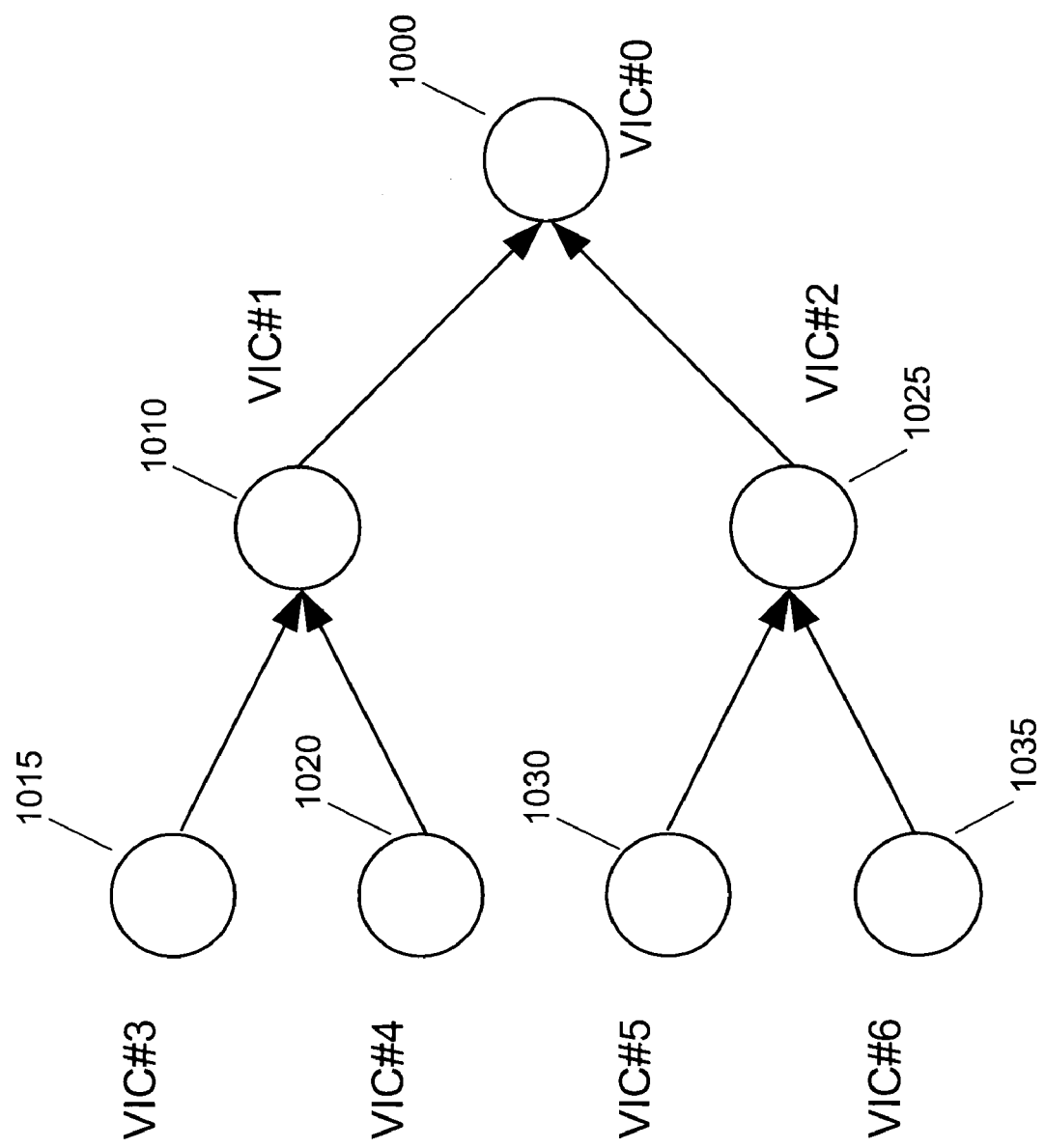
FIG. 9 illustrates a new daisy chained arrangement in accordance with an embodiment of the present invention.

This problem is alleviated in one embodiment of the present invention by providing each VIC with multiple daisy chain interfaces, in one embodiment two daisy chain interfaces, thereby allowing novel daisy chain structures such as that illustrated in FIG. 9 to be constructed. In the FIG. 9 example, VIC 1000 is coupled to a CPU, and can receive two daisy chain interrupt requests, one from VIC 1010 and one from VIC 1025. VIC 1010 can in turn receive daisy chain interrupt requests from VIC 1015 or VIC 1020, whilst VIC 1025 can receive daisy chain interrupt requests from VIC 1030 or VIC 1035. In the embodiment illustrated in FIG. 9, it can be seen that the propagation delay of the interrupt request generated by VIC number 6 1035 to the CPU is three clock cycles. In contrast, in FIG. 1 it can be seen that the corresponding propagation delay for VIC number 6 160 is 7 clock cycles. Hence, such an approach will enable a great reduction in the propagation delays of the system. Clearly this can be expanded to three daisy chain ports or more if necessary.

Figure 10:
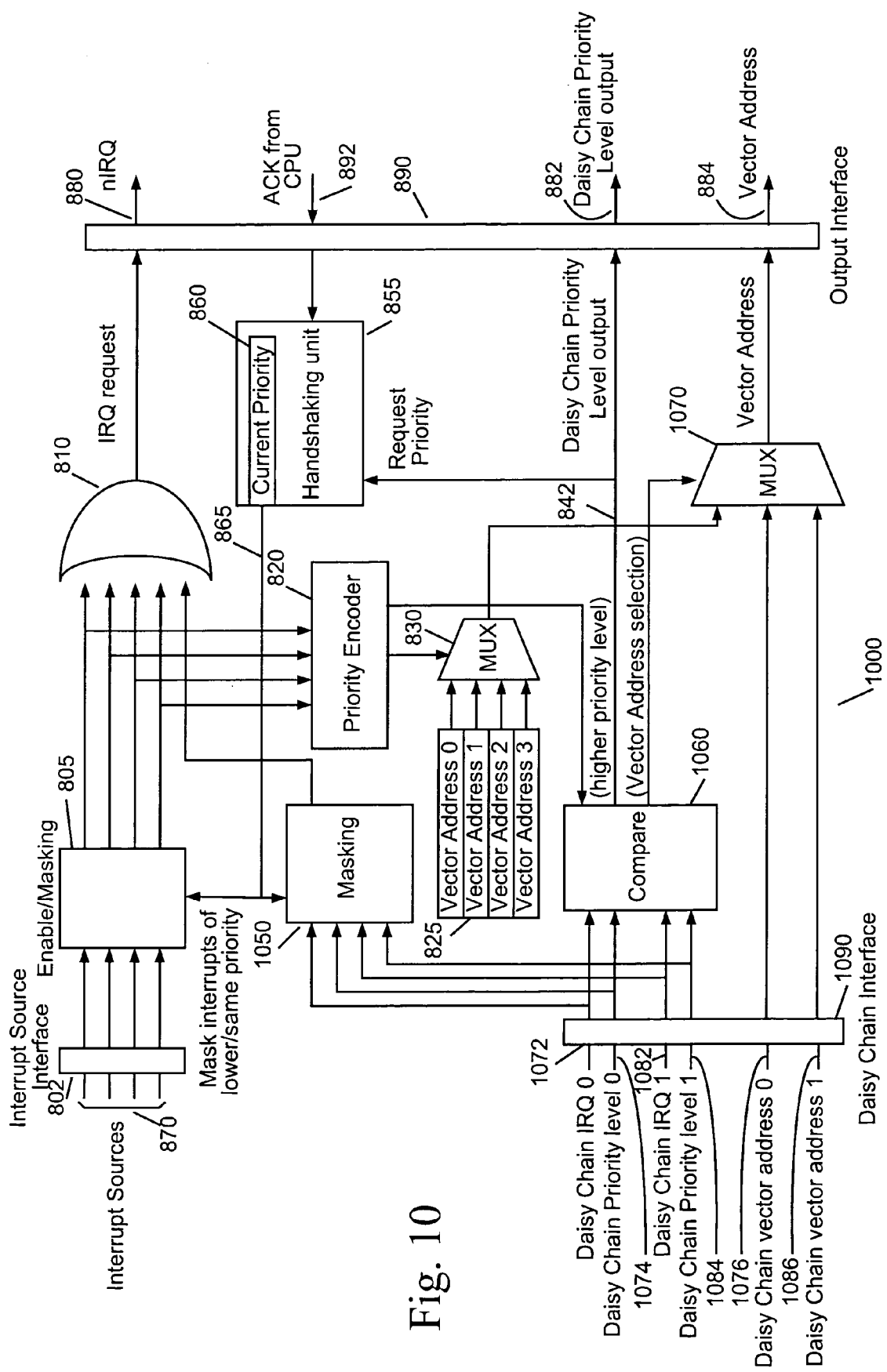
FIG. 10 is a block diagram illustrating a VIC in accordance with one embodiment of the present invention that is able to be employed in the daisy chained arrangement of FIG. 9.

FIG. 10 illustrates one embodiment of the structure of VIC 1000. In preferred embodiments, each of the other VICs 1010 to 1035 also have a similar structure. The FIG. 10 structure is based on a modification to the FIG. 7 VIC structure. It will be appreciated that the VIC 1000 could also be produced by an analogous modification to the FIG. 11 VIC structure.

Those elements in FIG. 10 which are the same as the elements illustrated in VIC 800 of FIG. 7 have been referenced with the same reference numerals, and will not be discussed further herein. As can be seen, the main difference is that the daisy chain interface 1090 now consists of two parts, one for receiving the first daisy chain interrupt request 1072, along with its corresponding priority level 1074 and vector address 1076, and a second part for receiving a second daisy chain interrupt request 1082, along with its corresponding priority level 1084 and vector address 1086.

Each daisy chain interrupt request and its associated priority level is routed to masking logic 1050 and comparison logic 1060. Masking logic 1050 will output a signal to OR gate 810 to cause an interrupt request to be generated if either of its input daisy chain interrupt requests has a priority level exceeding that of any current mask value output over path 865. The comparison logic 1060 will compare the priority level output by the priority encoder 820 with both of the priority levels 1074 and 1084, and will output over path 842 the highest priority level. In addition, the comparison logic 1060 will generate a control signal to multiplexer 1070 dependent on the detected highest priority, to ensure that the multiplexer 1070 selects the corresponding vector address from the two daisy chain vector addresses 1076 and 1086 and from the output of the multiplexer 830. Other than these changes, the VIC 1000 operates in the same way as described earlier for the VIC 800 of FIG. 7.

From the above description, it will be appreciated that when using VICs constructed in accordance with embodiments of the present invention, effective handling of priority information can be performed within a daisy chain architecture, thereby providing an interrupt priority connection methodology that allows easier interrupt priority management in software and simpler SoC design. In particular, since it can be ensured that higher priority interrupts will not be blocked within the daisy chain as would occur in a typical prior art daisy chain arrangement, then this provides much more flexibility as to how the various interrupt sources are connected to the VICs within the daisy chain.

Furthermore, in one embodiment of the present invention, latency in handling of interrupts is significantly reduced by providing each VIC with multiple daisy chain input ports. This enables significant performance improvements to be made within systems with a significant number of daisy chained VICs.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. An interrupt controller system comprising a plurality of interrupt controllers coupled in a daisy chain arrangement in order to prioritize interrupt requests generated by a plurality of interrupt sources, multiple ones of said plurality of interrupt controllers each including:
    an interrupt source interface for receiving interrupt requests generated by an associated plurality of interrupt sources;
    a daisy chain interface for receiving a single daisy chain interrupt request output by a further interrupt controller of said plurality of interrupt controllers lower in the daisy chain arrangement based on an additional plurality of interrupt requests generated by an additional plurality of interrupt sources, the daisy chain interface including a priority input for receiving a daisy chain priority signal indicating a priority associated with the daisy chain interrupt request;
    prioritization logic for receiving the daisy chain priority signal and for applying predetermined prioritization criteria to determine a highest priority interrupt request selected from the daisy chain interrupt request and the interrupt requests generated by the associated plurality of interrupt sources, the prioritization logic including a priority encoder for determining an initial highest priority interrupt request selected from the interrupt requests generated by the associated plurality of interrupt sources, and determination logic for determining the highest priority interrupt request selected from the initial highest priority interrupt request and the daisy chain interrupt request; and
    an output interface for outputting the highest priority interrupt request, the output interface including a priority output for providing an output priority signal indicating a priority associated with the highest priority interrupt request,
    wherein a first of said multiple interrupt controllers is a final interrupt controller in the daisy chain arrangement,
    wherein the output interface of the final interrupt controller is configured for coupling to a processor used to process the highest priority interrupt request, and
    wherein the output interface of another of said multiple interrupt controllers is configured for coupling to a further interrupt controller of said plurality of interrupt controllers higher in the daisy chain arrangement.

2. An interrupt controller system as claimed in claim 1, wherein the priority encoder generates an initial priority signal indicating a priority associated with the initial highest priority interrupt request, and the determination logic compares the initial priority signal with the daisy chain priority signal in order to determine the highest priority interrupt request.

3. An interrupt controller system as claimed in claim 2, wherein the determination logic generates the output priority signal to be output via the output interface.

4. An interrupt controller system as claimed in claim 1, wherein said multiple ones of said plurality of interrupt controllers each further comprise a storage for storing for each of the interrupt requests generated by the associated plurality of interrupt sources an associated vector address identifying an interrupt routine to be executed by a processor to process that interrupt request, the daisy chain interface including a vector address input for receiving a daisy chain vector address signal indicating a daisy chain vector address associated with the daisy chain interrupt request, and the output interface including a vector address output for providing an output vector address signal indicating an output vector address associated with the highest priority interrupt request.

5. An interrupt controller system as claimed in claim 4, wherein the prioritization logic comprises:
    a priority encoder for determining an initial highest priority interrupt request selected from the interrupt requests generated by the associated plurality of interrupt sources; and
    determination logic for determining the highest priority interrupt request selected from the initial highest priority interrupt request and the daisy chain interrupt request;
    wherein said multiple ones of said plurality of interrupt controllers each further comprises:
    an initial vector address selector for selecting from the storage an initial vector address associated with the initial highest priority interrupt request determined by the priority encoder; and
    an output vector address selector for receiving the initial vector address and the daisy chain vector address, and to select as the output vector address the vector address associated with the highest priority interrupt request determined by the determination logic.

6. An interrupt controller system as claimed in claim 5, wherein the determination logic generates a drive signal to control the output vector address selector.

7. An interrupt controller system as claimed in claim 1, wherein at least the final interrupt controller further comprises:
    current priority logic for storing the priority associated with a current highest priority interrupt request output by the output interface, the current priority logic being responsive to an acknowledgement signal from the processor indicating that the current highest priority interrupt request has been accepted by the processor as an accepted interrupt request to generate a mask signal identifying the priority stored in the current priority logic; and
    mask logic for suppressing, during processing of the accepted interrupt request by the processor, generation at the output interface of any interrupt requests having a priority lower than, or the same as, that of the accepted interrupt request.

8. An interrupt controller system as claimed in claim 7, wherein the mask logic comprises:
  first mask logic associated with the interrupt source interface and for preventing any interrupt requests with a priority lower than, or the same as, that of the accepted interrupt request from being processed by the prioritization logic; and
  second mask logic associated with the daisy chain interface and for preventing any daisy chain interrupt request with a priority lower than, or the same as, that of the accepted interrupt request from being processed by the prioritization logic.

9. An interrupt controller system as claimed in claim 7, wherein:
  the mask signal generated by the current priority logic is propagated to the further interrupt controller such that the further interrupt controller will only generate the daisy chain interrupt request if one of the additional plurality of interrupt requests has a priority higher than the accepted interrupt request;
  the mask logic being associated with the interrupt source interface and configured for preventing any interrupt requests generated by the associated plurality of interrupt sources that have a priority lower than, or the same as, that of the accepted interrupt request from being processed by the prioritization logic.

10. An interrupt controller system as claimed in claim 1, wherein said multiple ones of said plurality of interrupt controllers each further comprises a plurality of said daisy chain interfaces to allow a plurality of said further interrupt controllers to be connected to the interrupt controller, each further interrupt controller for generating a single daisy chain interrupt request and associated daisy chain priority signal based on a corresponding plurality of interrupt request received by that further interrupt controller, the prioritization logic for receiving each daisy chain priority signal and for applying the predetermined prioritization criteria to determine a highest priority interrupt request selected from the daisy chain interrupt requests and the interrupt requests generated by the associated plurality of interrupt sources.

11. An interrupt controller system as claimed in claim 2, wherein said multiple ones of said plurality of interrupt controllers each further comprises a plurality of said daisy chain interfaces to allow a plurality of said further interrupt controllers to be connected to the interrupt controller, each further interrupt controller for generating a daisy chain interrupt request and associated daisy chain priority signal based on a corresponding plurality of interrupt requests received by that further interrupt controller, the prioritization logic for receiving each daisy chain priority signal and for applying the predetermined prioritization criteria to determine a highest priority interrupt request selected from the daisy chain interrupt requests and the interrupt requests generated by the associated plurality of interrupt sources, and wherein the determination logic compares the initial priority signal with the daisy chain priority signals received at each daisy chain interface in order to determine the highest priority interrupt request.

12. An interrupt controller system as claimed in claim 5, wherein said multiple ones of said plurality of interrupt controllers each further comprises a plurality of said daisy chain interfaces to allow a plurality of said further interrupt controllers to be connected to the interrupt controller, each further interrupt controller for generating a daisy chain interrupt request and associated daisy chain priority signal based on a corresponding plurality of interrupt requests received by that further interrupt controller, the prioritization logic for receiving each daisy chain priority signal and for applying the predetermined prioritization criteria to determine a highest priority interrupt request selected from the daisy chain interrupt requests and the interrupt requests generated by the associated plurality of interrupt sources, and wherein the output vector address selector receives the initial vector address and the daisy chain vector addresses received at each daisy chain interface, and selects as the output vector address the vector address associated with the highest priority interrupt request determined by the determination logic.

13. An interrupt controller system as claimed in claim 8, wherein said multiple ones of said plurality of interrupt controllers each further comprises a plurality of said daisy chain interfaces to allow a plurality of said further interrupt controllers to be connected to the interrupt controller, each further interrupt controller for generating a daisy chain interrupt request and associated daisy chain priority signal based on a corresponding plurality of interrupt requests received by that further interrupt controller, the prioritization logic for receiving each daisy chain priority signal and to apply the predetermined prioritization criteria to determine a highest priority interrupt request selected from the daisy chain interrupt requests and the interrupt requests generated by the associated plurality of interrupt sources, and wherein the second mask logic is associated with each daisy chain interface and prevents any daisy chain interrupt request with a priority lower than, or the same as, that of the accepted interrupt request that is received by the associated daisy chain interface from being processed by the prioritization logic.

14. An interrupt controller system as claimed in claim 1, wherein the priority input of the daisy chain interface comprises a set of input pins for receiving the daisy chain priority signal.

15. An interrupt controller system as claimed in claim 1, wherein the priority output of the output interface comprises a set of output pins for providing the output priority signal.

16. A data processing apparatus comprising:
  a processor for processing interrupts, and
  an interrupt controller system comprising a plurality of interrupt controllers coupled in a daisy chain arrangement in order to prioritize interrupt requests generated by a plurality of interrupt sources, multiple ones of said plurality of interrupt controllers each including:
    an interrupt source interface for receiving interrupt requests generated by an associated plurality of interrupt sources;
    a daisy chain interface for receiving a single daisy chain interrupt request output by a further interrupt controller of said plurality of interrupt controllers lower in the daisy chain arrangement based on an additional plurality of interrupt requests generated by an additional plurality of interrupt sources, the daisy chain interface including a priority input for receiving a daisy chain priority signal indicating a priority associated with the daisy chain interrupt request;
    prioritization logic for receiving the daisy chain priority signal and for applying predetermined prioritization criteria to determine a highest priority interrupt request selected from the daisy chain interrupt request and the interrupt requests generated by the associated plurality of interrupt sources the prioritization logic including a priority encoder for determining an initial highest priority interrupt request selected from the interrupt requests generated by the associated plurality of interrupt sources, and determination logic for determining the highest priority interrupt request selected from the initial highest priority interrupt request and the daisy chain interrupt request; and an output interface for outputting the highest priority interrupt request, the output interface including a priority output for providing an output priority signal indicating a priority associated with the highest priority interrupt request, wherein a first of said multiple interrupt controllers is a final interrupt controller in the daisy chain arrangement, wherein the output interface of the final interrupt controller is configured for coupling to a processor used to process the highest priority interrupt request, and wherein the output interface of another of said multiple interrupt controllers is configured for coupling to a further interrupt controller of said plurality of interrupt controllers higher in the daisy chain arrangement.

17. A method of operating an interrupt controller system comprising a plurality of interrupt controllers coupled in a daisy chain arrangement in order to prioritize interrupt requests generated by a plurality of interrupt sources, comprising performing within each of multiple ones of said plurality of interrupt controllers:

(a) receiving at an interrupt source interface interrupt requests generated by an associated plurality of interrupt sources;

(b) receiving at a daisy chain interface a single daisy chain interrupt request output by a further interrupt controller of said plurality of interrupt controllers lower in the daisy chain arrangement based on an additional plurality of interrupt requests generated by an additional plurality of interrupt sources, and a daisy chain priority signal indicating a priority associated with the daisy chain interrupt request;

(c) with reference to the daisy chain priority signal, applying predetermined prioritization criteria to determine a highest priority interrupt request selected from the daisy chain interrupt request and the interrupt requests generated by the associated plurality of interrupt sources by performing the substeps of:

(c)(1) determining an initial highest priority interrupt request selected from the interrupt requests generated by the associated plurality of interrupt sources, and (c)(2) determining the highest priority interrupt request selected from the initial highest priority interrupt request and the daisy chain interrupt request;

(d) outputting from an output interface the highest priority interrupt request, and an output priority signaling indicating a priority associated with the highest priority interrupt request; and (e) for the interrupt controller of said multiple interrupt controllers corresponding to a final interrupt controller in the daisy chain arrangement, routing the highest priority interrupt request and associated output priority signal to a processor used to process that highest priority interrupt request, and for each interrupt controller of said multiple interrupt controllers not corresponding to the final interrupt controller, routing the highest priority interrupt request and associated output priority signal to a further interrupt controller of said plurality of interrupt controller in the daisy chain arrangement.

18. A method as claimed in claim 17, wherein the step (c)(1) comprises generating an initial priority signal indicating a priority associated with the initial highest priority interrupt request, and the step (c)(2) comprises the step of comparing the initial priority signal with the daisy chain priority signal in order to determine the highest priority interrupt request.

19. A method as claimed in claim 18, wherein the step (c)(2) further comprises generating the output priority signal to be output via the output interface.

20. A method as claimed in claim 17, further comprising performing within each of said multiple interrupt controllers the following:

storing for each of the interrupt requests generated by the associated plurality of interrupt sources an associated vector address identifying an interrupt routine to be executed by a processor to process that interrupt request;

receiving at the daisy chain interface a daisy chain vector address signal indicating a daisy chain vector address associated with the daisy chain interrupt request; and providing from the output interface an output vector address signal indicating an output vector address associated with the highest priority interrupt request.

21. A method as claimed in claim 20, wherein the step (c) comprises:

(c)(1) determining an initial highest priority interrupt request selected from the interrupt requests generated by the associated plurality of interrupt sources; and (c)(2) determining the highest priority interrupt request selected from the initial highest priority interrupt request and the daisy chain interrupt request;

the method further comprising performing within each of said multiple interrupt controllers the following:

selecting from the stored vector addresses an initial vector address associated with the initial highest priority interrupt request determined at the step (c)(1); and with reference to the initial vector address and the daisy chain vector address, selecting as the output vector address the vector address associated with the highest priority interrupt request determined at the step (c)(2).

22. A method as claimed in claim 21, wherein the step (c)(2) further comprises generating a drive signal to control the selection of the output vector address.

23. A method as claimed in claim 17, wherein the method further comprising performing within each of said multiple interrupt controllers the following:

storing a current priority associated with a current highest priority interrupt request output by the output interface;

in response to an acknowledgement signal from the processor indicating that the current highest priority interrupt request has been accepted by the processor as an accepted interrupt request, generating a mask signal identifying the stored current priority; and during processing of the accepted interrupt request by the processor, suppressing generation at the output interface of any interrupt requests having a priority lower than, or the same as, that of the accepted interrupt request.

24. A method as claimed in claim 23, wherein the suppressing step comprises:

preventing any interrupt requests with a priority lower than, or the same as, that of the accepted interrupt request from being processed at the step (c); and preventing any daisy chain interrupt request with a priority lower than, or the same as, that of the accepted interrupt request from being processed at the step (c).

25. A method as claimed in claim 23, further comprising:

propagating the generated mask signal to a further interrupt controller such that the further interrupt controller will only generate the daisy chain interrupt request if one of the additional plurality of interrupt requests has a priority higher than the accepted interrupt request;

and wherein the suppressing step comprises the step of preventing any interrupt requests generated by the associated plurality of interrupt sources that have a priority lower than, or the same as, that of the accepted interrupt request from being processed at the step (c).

26. A method as claimed in claim 17, wherein a plurality of said daisy chain interfaces are provided within each of said multiple interface controllers to allow receipt at said step (b) of a plurality of said daisy chain interrupt requests and associated daisy chain priority signals based on corresponding pluralities of interrupt requests, said step (c) comprising:

with reference to each daisy chain priority signal, applying the predetermined prioritization criteria to determine a highest priority interrupt request selected from the daisy chain interrupt requests and the interrupt requests generated by the associated plurality of interrupt sources.

27. A method as claimed in claim 18, wherein a plurality of said daisy chain interfaces are provided within each of said multiple interface controllers to allow receipt at said step (b) of a plurality of said daisy chain interrupt requests and associated daisy chain priority signals based on corresponding pluralities of interrupt requests, said step (c) comprising:

with reference to each daisy chain priority signal, applying the predetermined prioritization criteria to determine a highest priority interrupt request selected from the daisy chain interrupt requests and the interrupt requests generated by the associated plurality of interrupt sources;

and wherein the step (c)(2) comprises the step of comparing the initial priority signal with the daisy chain priority signals received at each daisy chain interface in order to determine the highest priority interrupt request.

28. A method as claimed in claim 21, wherein a plurality of said daisy chain interfaces are provided within each of said multiple interface controllers to allow receipt at said step (b) of a plurality of said daisy chain interrupt requests and associated daisy chain priority signals based on corresponding pluralities of interrupt requests, said step (c) comprising:

with reference to each daisy chain priority signal, applying the predetermined prioritization criteria to determine a highest priority interrupt request selected from the daisy chain interrupt requests and the interrupt requests generated by the associated plurality of interrupt sources;

and wherein the step of selecting the output vector address comprises the step of:

with reference to the initial vector address and the daisy chain vector addresses received at each daisy chain interface, selecting as the output vector address the vector address associated with the highest priority interrupt request determined at the step (c)(2).

29. A method as claimed in claim 24, wherein a plurality of said daisy chain interfaces are provided within each of said multiple interface controllers to allow receipt at said step (b) of a plurality of said daisy chain interrupt requests and associated daisy chain priority signals based on corresponding pluralities of interrupt requests, said step (c) comprising the step of:

with reference to each daisy chain priority signal, applying the predetermined prioritization criteria to determine a highest priority interrupt request selected from the daisy chain interrupt requests and the interrupt requests generated by the associated plurality of interrupt sources;

and wherein the step of preventing any daisy chain interrupt request with a priority lower than, or the same as, that of the accepted interrupt request from being processed at the step (c) is performed in respect of the daisy chain interrupt requests received by each daisy chain interface.

30. A method as claimed in claim 17, wherein the daisy chain interface comprises a set of input pins for receiving the daisy chain priority signal.

31. A method as claimed in claim 17, wherein the output interface comprises a set of output pins for providing the output priority signal.

* * * * *